United States Patent
Wang et al.

(10) Patent No.: US 12,302,258 B2
(45) Date of Patent: May 13, 2025

(54) TECHNIQUES FOR POWER CONTROL FOR DUAL SUBSCRIBERS

(71) Applicant: QUALCOMM Incorporated, San Diego, CA (US)

(72) Inventors: Shanshan Wang, San Diego, CA (US); Reza Shahidi, San Diego, CA (US); Francis Ming-Meng Ngai, Louisville, CO (US); Akhil Deodhar, Louisville, CO (US); Troy Curtiss, Boulder, CO (US); Bhupesh Manoharlal Umatt, Poway, CA (US); Lan Lan, San Diego, CA (US); Qingxin Chen, San Diego, CA (US); Leena Zacharias, San Jose, CA (US); Cheol Hee Park, San Diego, CA (US); Farhad Meshkati, San Diego, CA (US); Dinesh Kumar Devineni, San Diego, CA (US); Tienyow Liu, Santa Clara, CA (US); Tianpei Chen, San Diego, CA (US); Jagadish Nadakuduti, Mission Viejo, CA (US); Lin Lu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 435 days.

(21) Appl. No.: 17/652,027

(22) Filed: Feb. 22, 2022

(65) Prior Publication Data
US 2022/0295422 A1    Sep. 15, 2022

Related U.S. Application Data

(60) Provisional application No. 63/264,024, filed on Nov. 12, 2021, provisional application No. 63/158,639, filed on Mar. 9, 2021.

(51) Int. Cl.
H04W 52/28 (2009.01)
H04W 52/14 (2009.01)
H04W 52/36 (2009.01)

(52) U.S. Cl.
CPC ....... *H04W 52/367* (2013.01); *H04W 52/146* (2013.01); *H04W 52/28* (2013.01); *H04W 52/365* (2013.01)

(58) Field of Classification Search
CPC . H04W 52/367; H04W 52/146; H04W 52/28; H04W 52/365; H04W 52/34; H04W 72/1215; H04W 88/06
(Continued)

(56) References Cited

U.S. PATENT DOCUMENTS

| 10,919,490 B1* | 2/2021 | Akhoirshida ........... B60R 25/33 |
| 11,134,510 B1* | 9/2021 | Shukla ............... H04W 74/0808 |
| 2007/0149238 A1* | 6/2007 | Das ........................ H04W 52/40 455/69 |
| 2012/0083264 A1* | 4/2012 | Ramasamy ......... H04W 52/262 455/425 |

(Continued)

FOREIGN PATENT DOCUMENTS

| EP | 3261390 A1 | 12/2017 |
| GB | 2502969 A | 12/2013 |
| WO | WO-2018063567 A1 | 4/2018 |

OTHER PUBLICATIONS

International Search Report and Written Opinion—PCT/US2022/070780—ISA/EPO—Jun. 14, 2022.

*Primary Examiner* — Jean A Gelin
(74) *Attorney, Agent, or Firm* — Dalei Dong; Harrity & Harrity, LLP

(57) ABSTRACT

Various aspects of the present disclosure generally relate to wireless communication. A user equipment (UE) may configure a first initial set of maximum transmit powers for a first subscriber module. The UE may configure a second initial set of maximum transmit powers for a second subscriber module. The UE may configure a first maximum transmit power associated with a first connection for the first (Continued)

subscriber module. The UE may configure, independently of the configuration of the first maximum transmit power, a second maximum transmit power associated with the second connection. The UE may transmit based at least in part on at least one of the first maximum transmit power or the second maximum transmit power. Numerous other aspects are described.

12 Claims, 12 Drawing Sheets

(58) Field of Classification Search
USPC .......................................................... 370/318
See application file for complete search history.

(56) References Cited

U.S. PATENT DOCUMENTS

| | | | |
|---|---|---|---|
| 2013/0045700 A1* | 2/2013 | Stallman | H04B 1/3838 |
| | | | 455/129 |
| 2013/0310105 A1* | 11/2013 | Sagae | H04W 52/367 |
| | | | 455/522 |
| 2015/0031408 A1 | 1/2015 | Kalla et al. | |
| 2017/0013565 A1* | 1/2017 | Pelletier | H04W 52/367 |
| 2017/0040680 A1* | 2/2017 | Yen | H01Q 1/245 |
| 2017/0332333 A1* | 11/2017 | Santhanam | H04L 5/14 |
| 2019/0215783 A1 | 7/2019 | Chakraborty | |
| 2019/0356349 A1* | 11/2019 | Lan | H04W 52/24 |
| 2020/0127693 A1* | 4/2020 | Li | H04M 1/72484 |
| 2020/0383068 A1* | 12/2020 | Yang | H04W 52/283 |
| 2022/0264470 A1* | 8/2022 | Ding | H04W 52/365 |

* cited by examiner

TECHNIQUES FOR POWER CONTROL FOR DUAL SUBSCRIBERS

CROSS-REFERENCE TO RELATED APPLICATION

This patent application claims priority to U.S. Provisional Patent Application No. 63/158,639, filed on Mar. 9, 2021, entitled "TECHNIQUES FOR MANAGING TRANSMISSION POWER OF A MULTIPLE SUBSCRIBER IDENTITY MODULE USER EQUIPMENT," and to U.S. Provisional Patent Application No. 63/264,024, filed on Nov. 12, 2021, entitled "TECHNIQUES FOR POWER CONTROL FOR DUAL SUBSCRIBERS," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for power control for dual subscribers.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include establishing a first connection associated with a first subscriber module. The method may include establishing a second connection associated with a second subscriber module. The method may include configuring a first initial set of maximum transmit powers for the first subscriber module, wherein the first initial set of maximum transmit powers includes a first priority initial maximum transmit power and a second priority initial maximum transmit power. The method may include configuring a second initial set of maximum transmit powers for the second subscriber module, wherein the second initial set of maximum transmit powers includes a third priority initial maximum transmit power and a fourth priority initial maximum transmit power. The method may include configuring a first maximum transmit power associated with the first connection for the first subscriber module based at least in part on the first initial set of maximum transmit powers and an energy limit. The method may include configuring, independently of the configuration of the first maximum transmit power, a second maximum transmit power associated with the second connection for the second subscriber module based at least in part on the energy limit and the second initial set of maximum transmit powers. The method may include transmitting based at least in part on at least one of the first maximum transmit power or the second maximum transmit power.

Some aspects described herein relate to a method of wireless communication performed by a UE. The method may include identifying a first power level, corresponding to a first time period, of a first subscriber identity module (SIM) of the UE. The method may include identifying a second power level, corresponding to the first time period, of a second SIM of the UE, wherein the first power level and the second power level are identified based at least in part on at least one of an absorption rate or a permissible exposure limit. The method may include adjusting at least one of the first power level or the second power level during at least a portion of the first time period. The method may include transmitting a first transmission using the adjusted at least one of the first power level or the second power level.

Some aspects described herein relate to a UE for wireless communication. The user equipment may include a memory and one or more processors coupled to the memory. The one or more processors may be configured to establish a first connection associated with a first subscriber module. The one or more processors may be configured to establish a second connection associated with a second subscriber module. The one or more processors may be configured to configure a first initial set of maximum transmit powers for the first subscriber module, wherein the first initial set of maximum transmit powers includes a first priority initial maximum transmit power and a second priority initial maximum transmit power. The one or more processors may be configured to configure a second initial set of maximum transmit powers for the second subscriber module, wherein the second initial set of maximum transmit powers includes a third priority initial maximum transmit power and a fourth priority initial maximum transmit power. The one or more processors may be configured to configure a first maximum transmit power associated with the first connection for the first subscriber module based at least in part on the first initial set of maximum transmit powers and an energy limit. The one or more processors may be configured to configure, independently of the configuration of the first maximum transmit power, a second maximum transmit power associated with the second connection for the second subscriber module based at least in part on the energy limit and the second initial set of maximum transmit powers. The one or more processors may be configured to transmit based at least in part on at least one of the first maximum transmit power or the second maximum transmit power.

Some aspects described herein relate to a UE for wireless communication. The user equipment may include a memory and one or more processors coupled to the memory. The one or more processors may be configured to identify a first power level, corresponding to a first time period, of a first SIM of the UE. The one or more processors may be configured to identify a second power level, corresponding to the first time period, of a second SIM of the UE, wherein the first power level and the second power level are identified based at least in part on at least one of an absorption rate or a permissible exposure limit. The one or more processors may be configured to adjust at least one of the first power level or the second power level during at least a portion of the first time period. The one or more processors may be configured to transmit a first transmission using the adjusted at least one of the first power level or the second power level.

Some aspects described herein relate to a non-transitory computer-readable medium that stores a set of instructions for wireless communication by a UE. The set of instructions, when executed by one or more processors of the UE, may cause the UE to establish a first connection associated with a first subscriber module. The set of instructions, when executed by one or more processors of the UE, may cause the UE to establish a second connection associated with a second subscriber module. The set of instructions, when executed by one or more processors of the UE, may cause the UE to configure a first initial set of maximum transmit powers for the first subscriber module, wherein the first initial set of maximum transmit powers includes a first priority initial maximum transmit power and a second priority initial maximum transmit power. The set of instructions, when executed by one or more processors of the UE, may cause the UE to configure a second initial set of maximum transmit powers for the second subscriber module, wherein the second initial set of maximum transmit powers includes a third priority initial maximum transmit power and a fourth priority initial maximum transmit power. The set of instructions, when executed by one or more processors of the UE, may cause the UE to configure a first maximum transmit power associated with the first connection for the first subscriber module based at least in part on the first initial set of maximum transmit powers and an energy limit. The set of instructions, when executed by one or more processors of the UE, may cause the UE to configure, independently of the configuration of the first maximum transmit power, a second maximum transmit power associated with the second connection for the second subscriber module based at least in part on the energy limit and the second initial set of maximum transmit powers. The set of instructions, when executed by one or more processors of the UE, may cause the UE to transmit based at least in part on at least one of the first maximum transmit power or the second maximum transmit power.

Some aspects described herein relate to a non-transitory computer-readable medium that stores a set of instructions for wireless communication by a UE. The set of instructions, when executed by one or more processors of the UE, may cause the UE to identify a first power level, corresponding to a first time period, of a first SIM of the UE. The set of instructions, when executed by one or more processors of the UE, may cause the UE to identify a second power level, corresponding to the first time period, of a second SIM of the UE, wherein the first power level and the second power level are identified based at least in part on at least one of an absorption rate or a permissible exposure limit. The set of instructions, when executed by one or more processors of the UE, may cause the UE to adjust at least one of the first power level or the second power level during at least a portion of the first time period. The set of instructions, when executed by one or more processors of the UE, may cause the UE to transmit a first transmission using the adjusted at least one of the first power level or the second power level.

Some aspects described herein relate to an apparatus for wireless communication. The apparatus may include means for establishing a first connection associated with a first subscriber module. The apparatus may include means for establishing a second connection associated with a second subscriber module. The apparatus may include means for configuring a first initial set of maximum transmit powers for the first subscriber module, wherein the first initial set of maximum transmit powers includes a first priority initial maximum transmit power and a second priority initial maximum transmit power. The apparatus may include means for configuring a second initial set of maximum transmit powers for the second subscriber module, wherein the second initial set of maximum transmit powers includes a third priority initial maximum transmit power and a fourth priority initial maximum transmit power. The apparatus may include means for configuring a first maximum transmit power associated with the first connection for the first subscriber module based at least in part on the first initial set of maximum transmit powers and an energy limit. The apparatus may include means for configuring, independently of the configuration of the first maximum transmit power, a second maximum transmit power associated with the second connection for the second subscriber module based at least in part on the energy limit and the second initial set of maximum transmit powers. The apparatus may include means for transmitting based at least in part on at least one of the first maximum transmit power or the second maximum transmit power.

Some aspects described herein relate to an apparatus for wireless communication. The apparatus may include means for identifying a first power level, corresponding to a first time period, of a first SIM of the apparatus. The apparatus may include means for identifying a second power level, corresponding to the first time period, of a second SIM of the apparatus, wherein the first power level and the second power level are identified based at least in part on at least one of an absorption rate or a permissible exposure limit. The apparatus may include means for adjusting at least one of the first power level or the second power level during at least a portion of the first time period. The apparatus may include means for transmitting a first transmission using the adjusted at least one of the first power level or the second power level.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
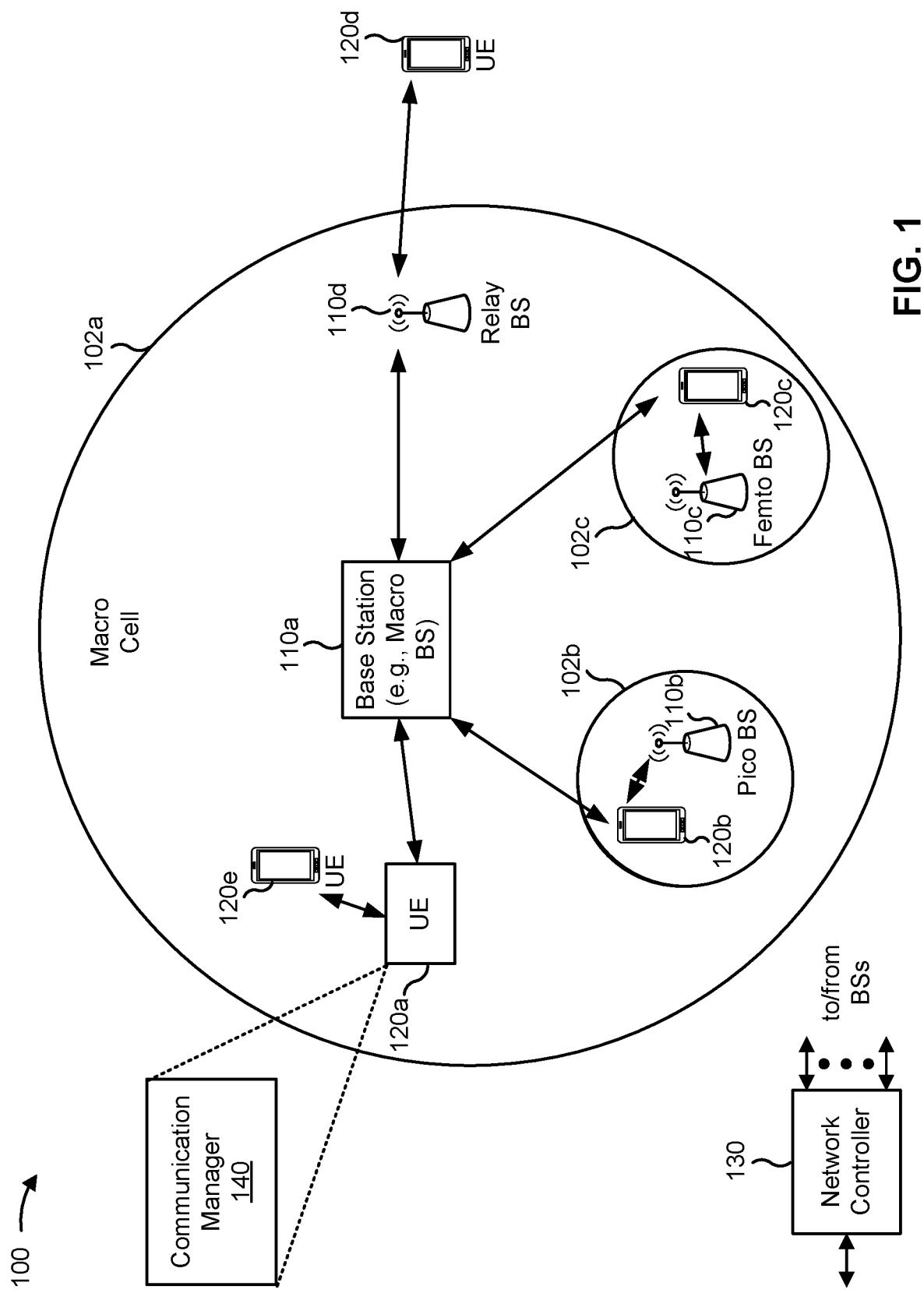
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may establish a first connection associated with a first subscriber module; establish a second connection associated with a second subscriber module; configure a first initial maximum transmit power for the first subscriber module and a second initial maximum transmit power for the second subscriber module; configure a first maximum transmit power associated with the first connection for the first subscriber and a second maximum transmit power associated with the second connection for the second subscriber module based at least in part on a compliance budget, wherein the first maximum transmit power and the second maximum transmit power are configured independently of one another, wherein the first maximum transmit power is based at least in part on the first initial maximum transmit power and the second maximum transmit power is based at least in part on the second initial maximum transmit power; and transmit based at least in part on at least one of the first maximum transmit power or the second maximum transmit power. Additionally, or alternatively, the communication manager 140 may perform one or more other operations described herein.

As indicated above, FIG. 1 is provided as an example. Other examples may differ from what is described with regard to FIG. 1.

Figure 2:
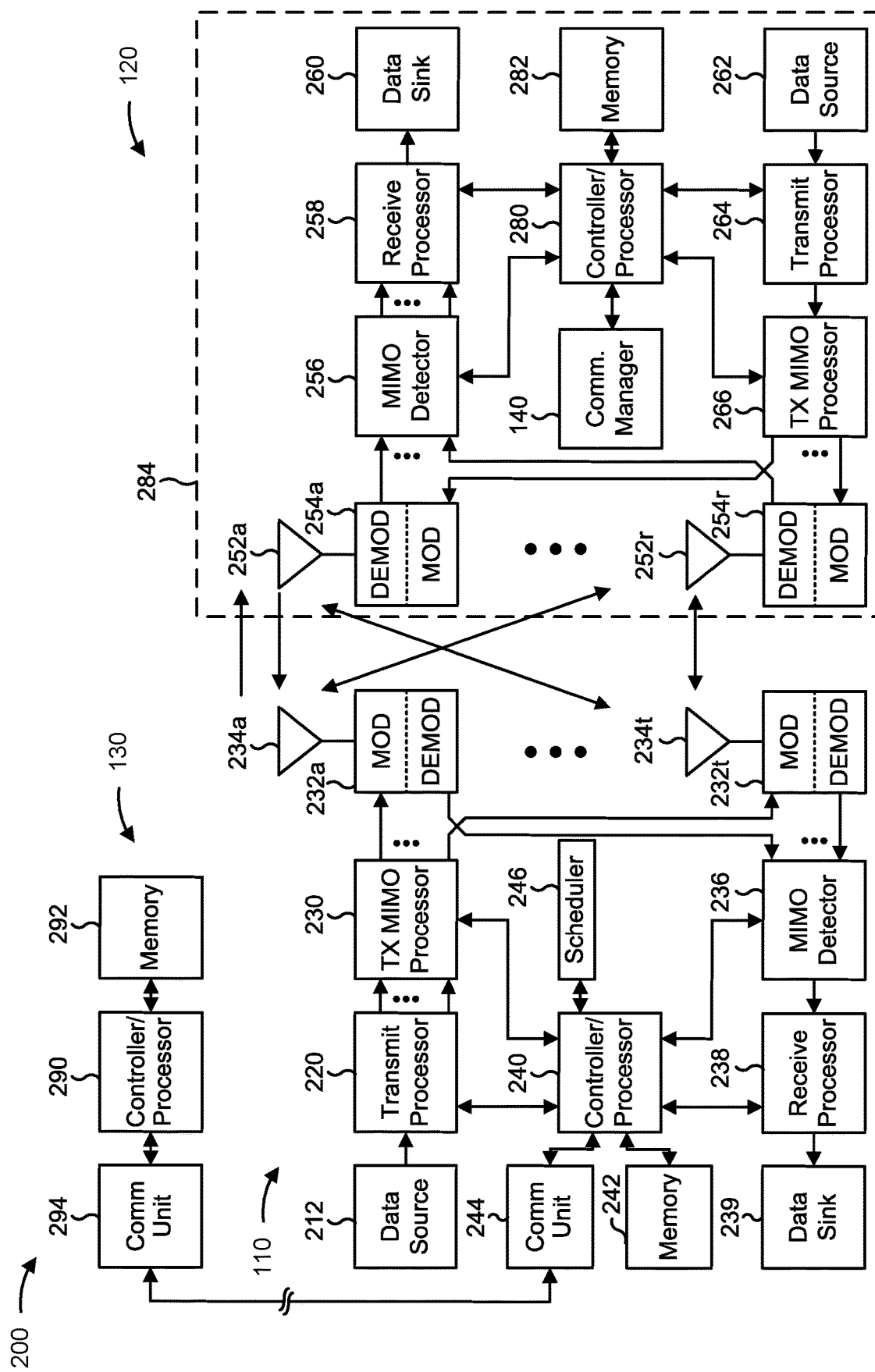
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with power control for dual subscribers, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 1000 of FIG. 10, and/or other processes as described herein. In some aspects, executing instructions may include running the instructions, converting the instructions, compiling the instructions, and/or interpreting the instructions.

In some aspects, the UE 120 includes means for establishing a first connection associated with a first subscriber module; means for establishing a second connection associated with a second subscriber module; means for configuring a first initial maximum transmit power for the first subscriber module and a second initial maximum transmit power for the second subscriber module; means for configuring a first maximum transmit power associated with the first connection for the first subscriber and a second maximum transmit power associated with the second connection for the second subscriber module based at least in part on a compliance budget, wherein the first maximum transmit power and the second maximum transmit power are configured independently of one another, wherein the first maximum transmit power is based at least in part on the first initial maximum transmit power and the second maximum transmit power is based at least in part on the second initial maximum transmit power; and/or means for transmitting based at least in part on at least one of the first maximum transmit power or the second maximum transmit power. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
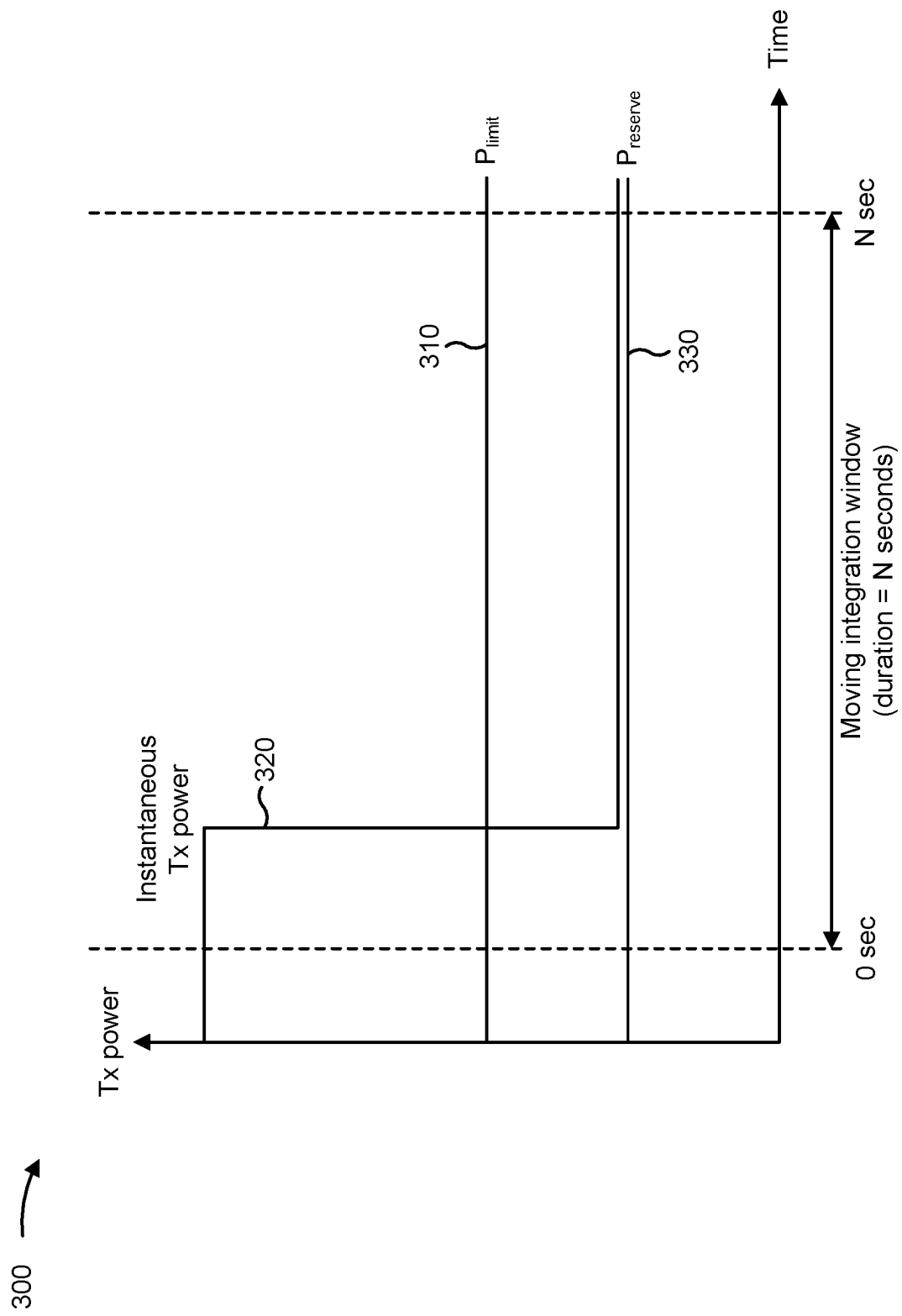
FIG. 3 is a diagram illustrating an example of a UE adapting transmit power over a moving integration window to satisfy one or more radio frequency (RF) radiation exposure limits, in accordance with the present disclosure.

FIG. 3 is a diagram illustrating an example 300 of a UE adapting transmit power over a moving integration window to satisfy one or more radio frequency (RF) radiation exposure limits, in accordance with the present disclosure.

Because UEs may emit RF waves, microwaves, and/or other radiation, UEs are generally subject to regulatory RF safety requirements that set forth specific guidelines, or exposure limits, that constrain various operations that the UEs can perform. For example, RF emissions may generally increase when a UE is transmitting, and the RF emissions may further increase in cases where the UE is performing frequent transmissions, high-power transmissions, or the like. Accordingly, because frequent and/or high-power transmissions may lead to significant RF emissions, regulatory agencies (e.g., the Federal Communications Commission (FCC) in the United States) may provide information related to acceptable RF radiation exposure when UEs are communicating using different radio access technologies.

In some examples, RF exposure may be expressed in terms of a specific absorption rate (SAR), which measures energy absorption by human tissue per unit mass and may have units of watts per kilogram (W/kg). For example, when a UE is communicating using a RAT that operates in a frequency range below 6 GHz, the applicable RF exposure parameter may include the SAR. In particular, SAR requirements generally specify that overall radiated power by a UE is to remain under a certain level to limit heating of human tissue that may occur when RF energy is absorbed. Because SAR exposure may be used to assess RF exposure for transmission frequencies less than 6 GHz, SAR exposure limits typically cover wireless communication technologies such as 2G/3G (e.g., CDMA), 4G (e.g., 3GPP Long Term Evolution (LTE)), certain 5G bands (e.g., NR in 6 GHz bands), IEEE 802.11ac, and other wireless communication technologies.

RF exposure may also be expressed in terms of power density (PD), which measures energy absorption per unit area and may be expressed in units of $mW/cm^2$. For example, when a UE is communicating using a RAT that operates in a high frequency range, such as a millimeter wave (mmW) frequency range, the applicable RF exposure parameter is PD, which may be regulated to limit heating of the UE and/or nearby surfaces. In certain cases, a maximum permissible exposure (MPE) limit in terms of PD may be imposed for wireless communication devices using transmission frequencies above 6 GHz. The MPE limit is a regulatory metric for exposure based on area, such as an energy density limit defined as a number, X, of watts per square meter ($W/m^2$) averaged over a defined area and time-averaged over a frequency-dependent time window to prevent a human exposure hazard represented by a tissue temperature change. Because PD limits are typically used to assess RF exposure for transmission frequencies higher than 10 GHz, PD limits typically cover wireless communication technologies such as IEEE 802.11ad, 802.11ay, certain 5G bands (e.g., mmWave bands), and other wireless communication technologies.

Accordingly, different metrics may be used to assess RF exposure for different wireless communication technologies.

UEs generally must satisfy all applicable RF exposure limits (e.g., SAR exposure limits or PD (e.g., MPE) exposure limits), which are typically regulatory requirements that are defined in terms of aggregate exposure over a certain amount of time, and the aggregate exposure may be averaged over a moving integration window (or moving time window), sometimes referred to as a compliance window. Some RF exposure limits, such as SAR exposure limits and PD exposure limits, can be expressed in terms of energy. For example, an RF exposure limit can indicate an amount of radiated or absorbed energy that is permissible within a time window. This amount of energy can be used to identify power limits for UEs, as described below.

For example, as shown in FIG. 3, and by reference number 310, a UE may be subject to an average power limit ($P_{limit}$) that corresponds to an average power at which an SAR exposure limit and/or an MPE (e.g., PD) limit is satisfied if the UE were to transmit substantially continuously over a moving integration window of N seconds (e.g., 100 seconds). Accordingly, as shown by reference number 320, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window, and then reduce the instantaneous transmit power until the moving integration window ends, to ensure that the MPE limit on aggregate exposure (which may be expressed in terms of energy) is satisfied over the entire moving integration window. In general, as shown by reference number 330, the UE may reduce the instantaneous transmit power to a reserve power level ($P_{reserve}$), which is a minimum transmit power level to maintain a link with a base station.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, sub-6 GHz frequency bands of 5G, etc.) and a second wireless communication technology operating above 6 GHz (e.g., mmWave bands of 5G in 24 to 60 GHz bands, IEEE 802.11ad or 802.11ay). In certain cases, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. By way of example, a UE may include multiple radios, modules, and/or antennas (referred to collectively herein simply as radios for convenience) corresponding to multiple RATs and/or frequency bands, which may be more readily understood with reference to FIG. 4. Since the UE is required to satisfy all applicable RF exposure parameters, the UE may be subject to both SAR and MPE limitations, or may be subject to different RF exposure parameters for different radios, modules, or antenna bands, as described elsewhere herein.

As indicated above, FIG. 3 is described as an example. Other examples may differ from what is described with regard to FIG. 3.

Figure 4:
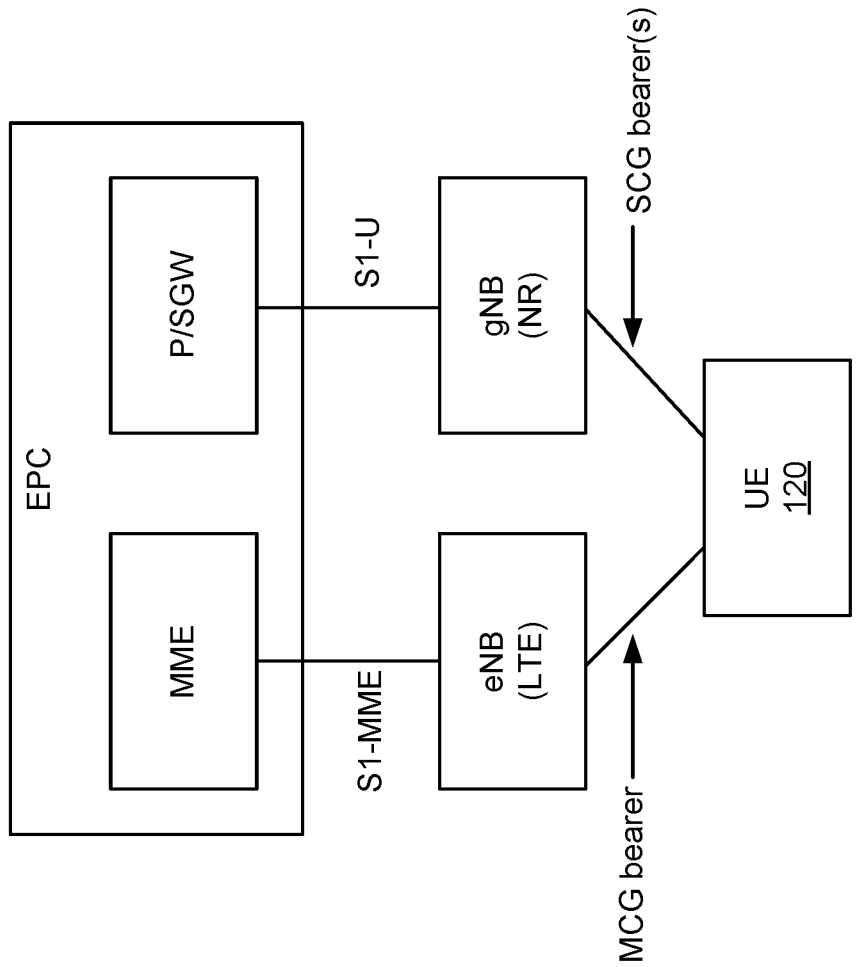
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. The ENDC mode is sometimes referred to as an NR or 5G non-standalone (NSA) mode. The ENDC mode is provided as one example of a scenario where a UE may implement multiple RAT technologies simultaneously, and thus may need to account for the RF exposure contribution of each RAT when satisfying any applicable RF exposure compliance limits. However, the described ENDC mode is provided merely as an example in which aspects of the technology may be employed, and in other aspects other dual connectivity modes and/or other multi-RAT communication technologies may be employed without departing from the scope of the disclosure.

In the ENDC mode, a UE 120 communicates using an LTE RAT on a master cell group (MCG), and the UE 120 communicates using an NR RAT on a secondary cell group (SCG). In some aspects, the UE 120 may communicate using dedicated radios corresponding to the multiple RATs. For example, for the ENDC mode, the UE 120 may communicate via the LTE RAT using a first radio, and the UE 120 may communicate via the NR RAT using a second radio. Moreover, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). Furthermore, aspects described herein may apply to a mode where the UE 120 communicates, in addition to or instead of using one or both of the LTE RAT and/or NR RAT, via one or more additional communication technologies, such as Wi-Fi, Bluetooth, IEEE 802.11ad, 802.11ay, or the like. Thus, as used herein, "dual connectivity mode" may refer to an ENDC mode, an NEDC mode, an NRDC mode, and/or another type of dual connectivity mode (e.g., communications using two or more connections via 2G, 3G, 4G, 4G LTE, 5G NR, 6G, Wi-Fi, Bluetooth, IEEE 802.11ad, 802.11ay, etc.).

Returning to the ENDC example, and as shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Again, although the example 400 depicted in FIG. 4 depicts an ENDC mode as one example of how a UE 120 may utilize more than one radio and/or RAT, the disclosure is not so limited, and in other aspects the UE 120 may employ two or more radios differently than in the manner described in connection with FIG. 4. For example, a UE may include multiple radios corresponding to multiple RATs and/or frequency bands. For example, the UE may be capable of communicating using various RATs, such as 2G, 3G, 4G, 4G LTE, 5G NR, 6G, Wi-Fi, Bluetooth, IEEE 802.11ad, and/or 802.11ay. Additionally, or alternatively, the UE may be capable of communication on various frequency bands within a RAT (e.g., FR1, FR2, FR3, FR4a, FR4-1, FR4, and/or FR5). Additionally, or alternatively, in some aspects the UE may be capable of operating in modes in addition to those described in detail above including, for example, an uplink carrier aggregation (UL CA) mode, a dual SIM dual active (DSDA) mode, a WiFi plus wide-area network (WAN) mode, and the like. For each RAT and/or frequency band, the UE may include a corresponding radio configured to communicate on that RAT and/or frequency band. Moreover, in some cases, a UE may be configured to communicate using two or more radios concurrently. For example, a UE may communicate over 5G NR while simultaneously communicating via Bluetooth or a similar RAT. As another example, the UE may communicate using multiple component carriers, such as via one or more component carriers using a first radio and via one or more other component carriers using a second radio. In such instances, each individual radio may use a certain level of allocated power to transmit communications, and collectively the transmitting radios must satisfy any applicable SAR exposure and/or MPE (e.g., PD) limitations. Thus, the techniques described herein provide power control for a plurality of communication links. A communication link can be associated with a radio, a RAT, a MCG link or SCG link of a dual connectivity mode, a component carrier, a combination thereof, or the like. For example, the techniques defined herein may provide power control for a first radio using a first RAT, a second radio using a second RAT, a third radio associated with a first component carrier of a given RAT, a fourth radio associated with a second component carrier of the given RAT, and so on. In some aspects, a pair of communication links and/or radios may be implemented using any of the dual connectivity and/or multi-radio modes described above.

When a UE is transmitting using more than one radio, the SAR and/or MPE contributions from each radio must collectively remain under the applicable SAR and/or MPE limits. Accordingly, for a given transmission timeframe or compliance window, a UE may allocate a portion of the total energy available for transmission (e.g., the total energy that can be utilized by the UE while remaining under the applicable SAR and/or MPE limits for the transmission timeframe) to each radio such that, collectively, the radios will not exceed the applicable SAR and/or MPE limits. Put another way, for given SAR exposure and PD limits (e.g., represented as $SAR_{lim}$ and $PD_{lim}$), the sum of the normalized SAR exposure and/or PD contributions of each radio (e.g., the SAR exposures and/or PD contribution of the radio, represented as $SAR_i$ and/or $PD_i$, divided by the applicable SAR exposure and/or PD limit, represented as $SAR_{lim}$ and/or $PD_{lim}$) must be less than or equal to one. Assuming that SAR exposure limits are applicable to radios operating in frequency bands below 6 GHz, and that MPE (e.g., PD) limits are applicable to radios operating in frequency bands above 6 GHz, the applicable SAR exposure and/or PD limits can be summarized as shown in the following equation:

$$\sum_{i=100\,kHz}^{6\,GHz} \frac{SAR_i}{SAR_{lim}} + \sum_{i=6\,GHz}^{300\,GHz} \frac{PD_i}{PD_{lim}} \le 1.$$

To maintain power output of a UE such that the UE satisfies the above condition, a total transmission energy available to the UE for a given transmission timeframe or compliance window is allocated among the various radios so that, if the radios transmit simultaneously, the collective power output remains under the applicable SAR exposure and/or MPE (e.g., PD) limits.

As indicated above, FIG. 4 is provided as an example. Other examples may differ from what is described with respect to FIG. 4.

Figure 5:
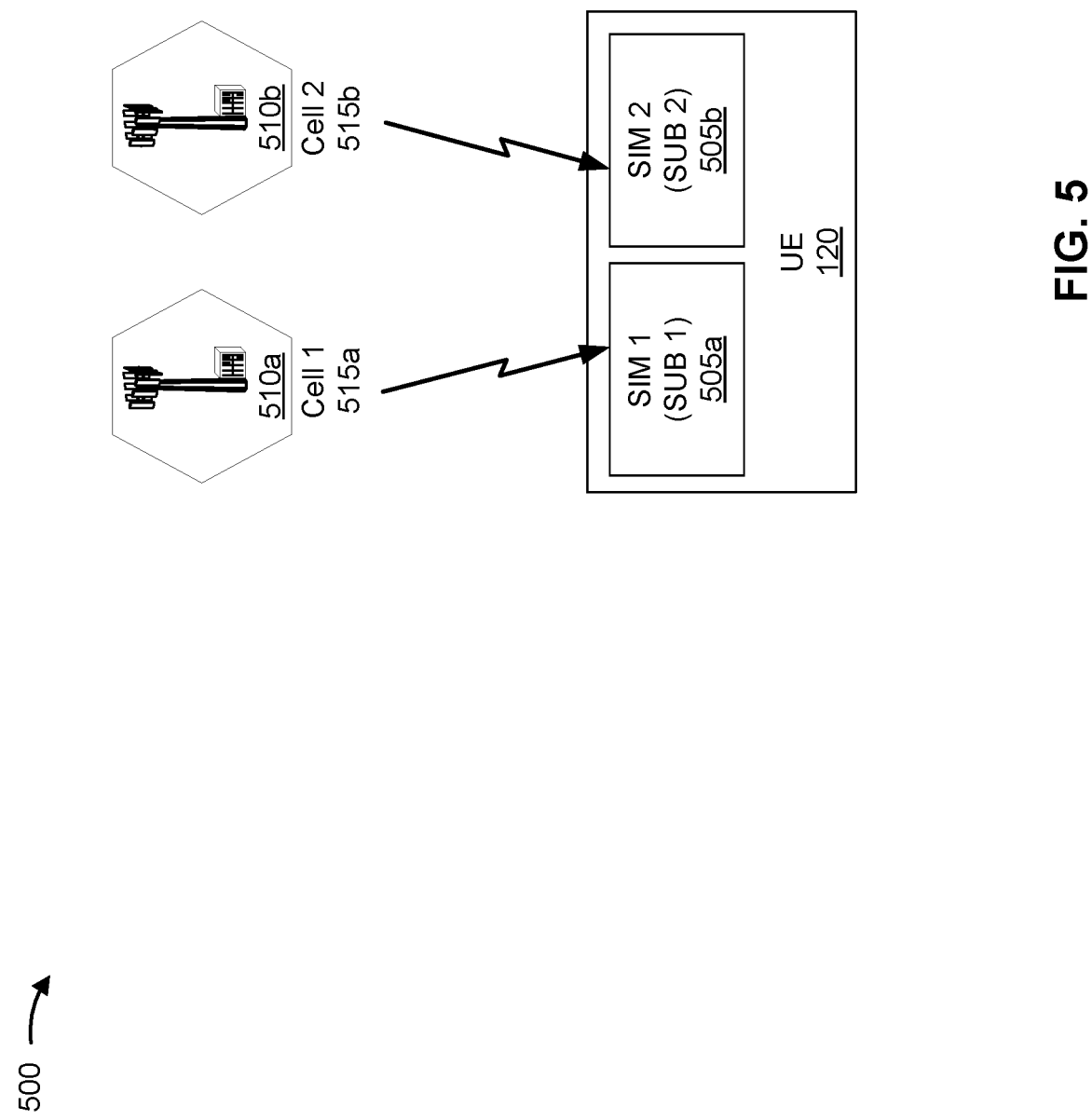
FIG. 5 is a diagram illustrating an example of a multiple subscriber identity module (SIM) UE, in accordance with the present disclosure.

FIG. 5 is a diagram illustrating an example 500 of a multiple subscriber identity module (SIM) UE, in accordance with the present disclosure. As shown in FIG. 5, a UE 120 may be a multiple SIM (multi-SIM) UE that includes multiple SIMS (two or more SIMs), shown as a first SIM 505a and a second SIM 505b. The first SIM 505a may be associated with a first subscription (shown as SUB 1), and the second SIM 505b may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 505 may be a removable SIM (for example, a SIM card) or an embedded SIM. A SIM 505 may include an integrated circuit that securely stores an international mobile subscriber identity (IMSI) and a security key, which are used to identify and authenticate a corresponding subscription associated with the SIM 505. In some cases, a SIM 505 may store a list of services that the UE 120 has permission to access using a subscription associated with the SIM 505, such as a data service or a voice service, among other examples.

As further shown in FIG. 5, the UE 120 may communicate (for example, in a connected mode, an idle mode, or an inactive mode) with a first base station 510a via a first cell 515a (shown as Cell 1) using the first SIM 505a. In this case, a first subscription (SUB 1) of the UE 120 may be used to access the first cell 515a (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 510b via a second cell 515b (shown as Cell 2) using the second SIM 505b. In this case, a second subscription (SUB 2) of the UE 120 may be used to access the second cell 515b (for example, using a second IMSI for UE identification, using a second security key for UE authentication, using a second list of services that the UE 120 is permitted to access using the second subscription, or by counting data or voice usage on the second cell against the second subscription, among other examples).

The first base station 510a and/or the second base station 510b may include one or more of the base stations 110 described above in connection with FIG. 1. Although the first cell 515a and the second cell 515b are shown as being provided by different base stations, in some aspects, the first cell 515 and the second cell 515b may be provided by the same base station. Thus, in some aspects, the first base station 510a and the second base station 510b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a DSDA mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 505a (and the first subscription) at the same time as communicating using the second SIM 505b (and the second subscription). For example, when the UE 120 is in an active session (e.g., a voice call or another latency sensitive service, such as online gaming, stock trading, or an over-the-top (OTT) service) using the first SIM 505a, the UE 120 is capable of receiving a notification of a voice call using the second SIM 505b without interrupting communications that use the first SIM 505a, and without tuning or switching away from the first cell 515a to tune to the second cell 515b.

In a DSDS mode, the UE 120 is not capable of concurrent active communication using both SIMS of the UE 120. Thus, a UE 120 in the DSDS mode is not capable of communicating using the first SIM 505a (and the first subscription) at the same time as communicating using the second SIM 505b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 515a (as well as the first SIM 505a and the first subscription) uses an NR RAT and the second cell 515b (as well as the second SIM 505b and the second subscription) also uses the NR RAT. However, the UE 120 may not be capable of operating in a DSDA mode for NR+LTE, where one of the first cell 515a (as well as the first SIM 505a and the first subscription) uses an NR RAT and the second cell 515b (as well as the second SIM 505b and the second subscription) uses an LTE RAT (or vice versa). In some aspects, the UE 120 may not be capable of operating in the DSDA mode for the second combination of RATs (e.g., NR+LTE), but be capable of operating in a DSDS mode for the second combination of RATs. This UE design reduces design costs as compared to enabling the UE 120 to operate using the DSDA mode for the second combination of RATs.

SAR limits and MPE values may be established to regulate a UE's electromagnetic energy emission levels during transmission. For example, allowed SAR and MPE levels may be defined by regulatory bodies. A UE may adjust its power levels on each antenna, based on service priority, over time to ensure regulatory compliance of SAR and MPE. In a DSDA scenario, balancing the performance of two active SIMS with meeting regulatory requirements can be challenging. In some cases, a transmission power for each SIM is determined based on a service priority and, thus, will be fixed for a given service. As a result, backing off fixed transmission powers for services can lead to inefficiencies and can have a negative impact on UE performance. Furthermore, techniques involving communication between the two SIMS to facilitate energy transfer between the SIMS (such as so that the two SIMS can share unused energy budget among themselves) may involve complex communication between the SIMS or management by a component of the UE. Further improvements in power management for two SIMS in a DSDA mode may be desirable.

Some aspects of the techniques and apparatuses described herein may facilitate managing transmission power of a multiple SIM UE in such a way as to balance the performance of the SIMS with the regulatory requirements. In some aspects, for example, the UE may identify a first power level for a first SIM and a second power level for a second SIM, where the first power level and the second power level are identified based at least in part on at least one of an absorption rate or a permissible exposure limit. In some aspects, the first power level and/or the second power level may be adjusted, during an emission control loop interval. For example, in some aspects, priority rules may be applied at a granular level to establish high and low priority power adjustment intervals that have a shorter duration than the emission control loop interval. In some aspects, emission control loop evaluation may be performed asynchronously based at least in part on detection of trigger events.

In some aspects, unused energy may be transferred from one SIM to another SIM, and in some aspects, spatial adjustments may be made to facilitate emission control compliance while maintaining SIM performance across multiple SIMS. In this way, some aspects provide a flexible and adaptive multiple SIM UE that may balance DSDA performance with regulatory compliance. As a result, some aspects may introduce efficiencies and may have a positive impact on UE performance.

Some techniques and apparatuses described herein provide compliance budget management for a DSDA UE, such that compliance of two active SIMS with SAR and MPE regulations is ensured. For example, a maximum transmit power of a first SIM may be managed independently of a maximum transmit power of a second SIM (e.g., the first SIM and the second SIM may not perform energy transfer between one another). In some aspects, the UE may determine a maximum transmit power for a SIM based at least in part on a "save before use" approach, in which unused or under-used energy can be saved for subsequent transmission using a higher transmit power. In some aspects, the UE may determine a budget indicating energy usage over time (based at least in part on an initial maximum transmit power), which may balance sustainability and uplink coverage of transmissions. Some techniques and apparatuses described herein provide for power headroom calculation such that network impact of varying uplink transmit power of one or more SIMS is reduced. In this way, uplink transmit power utilization may be improved and compliance with SAR and MPE regulatory limitations may be ensured.

As indicated above, FIG. 5 is provided as an example. Other examples may differ from what is described with regard to FIG. 5.

Figure 6:
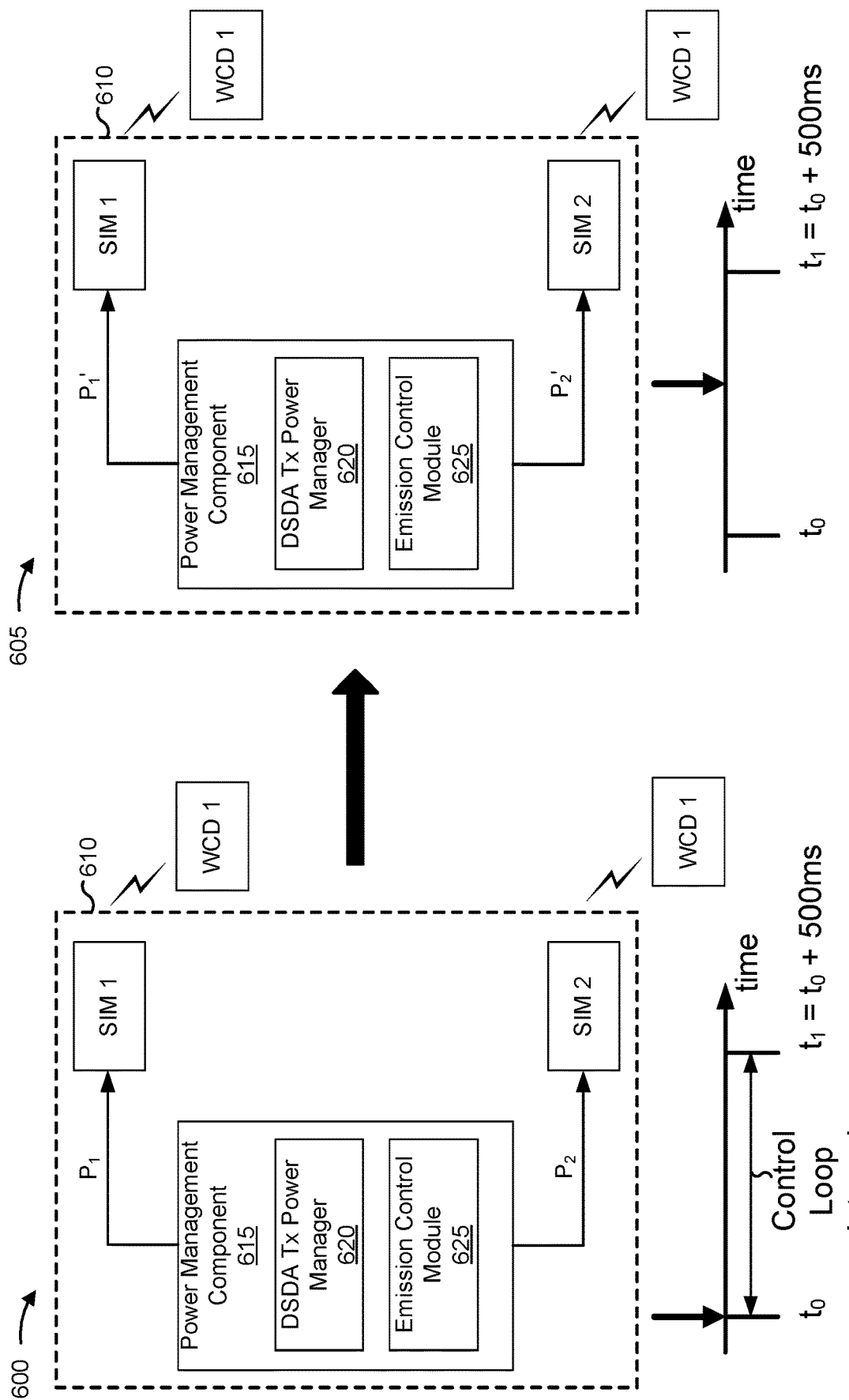
FIG. 6 is a diagram illustrating an example associated with managing transmission power of a multiple SIM UE, in accordance with the present disclosure.

FIG. 6 is a diagram illustrating examples 600 and 605 associated with managing transmission power of a multiple SIM UE, in accordance with the present disclosure. As shown, a UE 610 may communicate with a first wireless communication device (WCD 1) and a second wireless communication device (WCD 2). The UE 610 may be a multi-SIM UE capable of DSDA operation, and may include a first SIM (SIM 1), a second SIM (SIM 2), and a power management component 615. The WCD 1 and WCD 2 may be any type of devices such as, for example, base stations.

The power management component 615 may include, for example, a DSDA transmission (Tx) power manager 620 and an emission control module 625. In some aspects, the DSDA Tx power manager 620 may be configured to implement one or more power algorithms to facilitate balancing power allocation between SIM 1 and SIM 2. The emission control module 625 may be configured to evaluate compliance with emission limits (e.g., SAR and/or MPE limits) and to facilitate allocation of power between SIM 1 and SIM 2 so as to maintain regulatory compliance. In some aspects, the DSDA Tx power manager 620 and the emission control module 625 may be integrated.

The example 600 illustrates the UE 610 at a first time, to. As shown, the UE 610, using a power management component 615, may identify a first power level, P1, corresponding to a first time period, of SIM 1, and a second power level, corresponding to the first time period, of SIM 2. In some aspects, the UE 610 (e.g., using the power management component 615) may identify the first and second power levels based at least in part on at least one of an absorption rate (e.g., SAR) or a permissible exposure limit (e.g., MPE). In some aspects, the first power level and/or the second power level may include a maximum power level and/or an average power level, among other examples.

As shown by example 605, the UE 610 may adjust at least one of the first power level P1 (e.g., to an adjusted first power level, P1') or the second power level P2 (e.g., to an adjusted second power level, P2') during at least a portion of the first time period. The UE 610 may transmit a first transmission using the adjusted at least one of the first power level P1' or the second power level P2'.

The first time may be a starting time of an emission control loop interval. In some aspects, the control loop interval may have a configured time duration (e.g., of 500 ms). For example, the UE 610 may be configured to perform synchronous evaluation of SAR/MPE limits and/or asynchronous evaluation thereof. In synchronous evaluation, the UE 610 may perform the evaluation at the end of the emission control loop interval (e.g., every 500 ms). In asynchronous evaluation, as shown in the example 605, the UE 610 may perform the evaluation at a time that falls within the synchronous control loop interval window.

For example, the UE 610 may perform an asynchronous emission condition evaluation based at least in part on detecting an occurrence of an asynchronous evaluation trigger event. In some aspects, a power class associated with a band used by the SIM 1 may be the same as or different than a power class associated with a band used by the SIM 2. The asynchronous evaluation trigger event may include a service priority switch event. In some aspects, the UE 610 may detect the occurrence of the asynchronous evaluation trigger event based at least in part on determining that the SIM 1 switched from providing a first service having a first priority level to a second service having a second priority level that is different than the first priority level, and determining that the SIM 2 switched from providing a third service having the second priority level to a fourth service having the first priority level. The first priority level may be a high priority level and the second priority level may be a low priority level.

In some aspects, a high priority level may be a priority level that is higher than another priority level (which may be referred to as a low priority level). In some aspects, a high priority level may be a priority level that is equal to or greater than a certain priority value, and/or a priority level that satisfies a priority condition, among other examples. Similarly, a low priority level may be a priority level that is lower than another priority level (which may be referred to as a high priority level). In some aspects, a low priority level may be a priority level that is equal to or less than a certain priority value, and/or a priority level that satisfies a priority condition, among other examples.

In some aspects, the UE 610 may determine that a prior aggregated power fails to satisfy an emission condition associated with the at least one of the absorption rate or the permissible exposure limit. Adjustment of the at least one of the first power level or the second power level may include applying, based at least in part on determining that the prior aggregated power fails to satisfy the emission condition, a power backoff to at least one of the SIM 1 or the SIM 2. The UE 610 may apply the power backoff based at least in part on determining a first priority level associated with the first transmission and determining a second priority level associated with a second transmission, where the first priority level is higher than the second priority level.

In some aspects, the UE 610 may apply the power backoff based at least in part on determining the first priority level and the second priority level. For example, the first transmission may include an active voice transmission and the second transmission may include at least one of a delay-sensitive gaming transmission, a voice on-hold transmission, or an internet data transmission. In some aspects, a priority level associated with the voice on-hold transmission may be higher than a priority level associated with the internet data transmission, a priority level associated with the delay-sensitive gaming transmission may be higher than the priority level associated with the voice on-hold transmission, and a priority level associated with the active voice transmission may be higher than the priority level associated with the delay-sensitive gaming transmission.

In some aspects, the first transmission may correspond to at least one of a wireless wide area network and the second transmission may correspond to a wireless local area network. In some aspects, the first transmission may correspond to a primary component carrier and the second transmission may correspond to a secondary component carrier. In some aspects, the first transmission may correspond to a first frequency range (e.g., FR1) and the second transmission may correspond to a second frequency range (e.g., FR2). In some aspects, the UE may determine the first priority level associated with the first transmission based at least in part on a determination that at least one of an uplink event or an uplink grant comprises at least one of a high priority signaling event, a carrier-sanctioned voice transmission, a carrier-sanctioned video telephony transmission, a conversational video transmission, internet data, best-effort data, over-the-top data, multimedia messaging service (MMS) data, short message service (SMS) data, gaming data, extended reality data, or a shared transmission.

In some aspects, the SIM 1 may use a first antenna of an antenna group to transmit the first transmission and the SIM 2 may use a second antenna of the antenna group to transmit a second transmission. The UE 610 may determine the first power level and the second power level based at least in part on determining a first maximum power level corresponding to a high priority power adjustment interval and determining a second maximum power level corresponding to a low priority power adjustment interval. The UE 610 may apply the first maximum power level to the SIM 1 for the first power adjustment interval and the second maximum power level to the SIM 2 for the first power adjustment interval. The UE 610 may determine an occurrence of a power adjustment point and apply, based at least in part on determining the occurrence of the power adjustment point, the first maximum power level to the SIM 2 for a second power adjustment interval, and apply, based at least in part on determining the occurrence of the power adjustment point, the second maximum power level to the SIM 1 for the second power adjustment interval. In this way, for example, although the service priority of the SIM 1 and/or the SIM 2 may not change, the power level can be switched across power adjustment intervals.

In some aspects, the UE 610 may determine of the occurrence of the power adjustment point based at least in part on determining an ending point of the first power adjustment interval based at least in part on a timing configuration. The timing configuration may indicate at least one high priority power adjustment interval allocated to the SIM 1, wherein the at least one high priority power adjustment interval allocated to the SIM 1 corresponds to at least one low priority power adjustment interval allocated to the SIM 2, and at least one low priority power adjustment interval allocated to the first SIM, wherein the at least one low priority power adjustment interval allocated to the first SIM corresponds to at least one high priority power adjustment interval allocated to the second SIM.

In some aspects, when the two SIMS transmit using antennas in different antenna groups, the UE 610 may use the identified maximum power level for the entire emission control loop interval. For example, the UE 610 may identify the first power level and the second power level based at least in part on determining a first maximum power level corresponding to the first SIM and determining a second maximum power level corresponding to the second SIM. The UE 610 may apply the first maximum power level to the SIM 1 for a first power adjustment interval, where the SIM 1 provides a service having a high priority during a first power adjustment interval, and may apply the second maximum power level to the SIM 2 for the first power adjustment interval, where the SIM 2 provides a service having a low priority during the first power adjustment interval. The UE 610 may apply the first maximum power level to the SIM 1 for a second power adjustment interval, where the SIM 1 provides a service having a low priority during the second power adjustment interval. The UE 610 may apply the second maximum power level to the SIM 2 for the second power adjustment interval, where the SIM 2 provides a service having a high priority during the second power adjustment interval.

In some aspects, the UE 610 may identify the first power level and the second power level based at least in part on allocating the first power level to the SIM 1 during a prior high priority power adjustment interval. The UE 610 may obtain historical information associated with the SIM 1 during the prior high priority power adjustment interval to generate an energy profile associated with the prior high priority power adjustment interval. The energy profile may indicate energy emissions, transmission powers, and/or SAR associated with the prior high priority power adjustment interval, among other examples.

The UE 610 may access the energy profile and determine an amount of transferrable energy based at least in part on referencing the energy profile. The UE 610 may allocate the second power level to the SIM 2 for a second transmission. The second power level may include the amount of transferrable energy. In some aspects, determining the amount of transferrable energy may include determining a percentage of a remaining energy associated with the SIM 1 during the prior high priority power adjustment interval. The UE 610 may further implement a configuration that indicates the percentage. In some aspects, the UE 610 may reserve a reserve amount of the remaining energy for one or more usages corresponding to the SIM 1. The usages may include, for example, extended high priority power adjustment intervals and/or transmissions during low priority periods.

In some aspects, the UE 610 may update the at least one of the first power level and the second power level using an iterative updating procedure based at least in part on one or more updating parameters. The one or more updating parameters may include an updated amount of transferrable energy, an amount of transferrable energy used by the SIM 2 during the second transmission, a power class associated with the SIM 1, a power class associated with the SIM 2, a configured maximum power of the first SIM, a configured maximum power of the SIM 2, a spatial relationship between an antenna used by the SIM 1 and an antenna used by the SIM 2, a RAT used by the SIM 1, an energy efficiency associated with the RAT used by the SIM 1, a spectrum efficiency associated with the RAT used by the SIM 1, a RAT used by the second SIM, an energy efficiency associated with the RAT used by the SIM 2, and/or a spectrum efficiency associated with the RAT used by the SIM 2, among other examples.

In some aspects, the UE 610 may use spatial adjustments to facilitate compliance with emissions regulations. For example, in some aspects, identifying the first power level and the second power level may include associating the SIM 1 with a first antenna, where the first power level is associated with the first antenna. The UE 610 may associate the SIM 2 with a second antenna, where the second power level is associated with the second antenna. The first antenna may be associated with a first antenna group and the second antenna is associated with a second antenna group.

In some aspects, the UE 610 may select at least one of the first antenna or the second antenna from a prioritized list of a plurality of antennas. For example, in some aspects, the first antenna is included in a first prioritized list, corresponding to the SIM 1, of a first plurality of antennas. The second antenna may be included in a second prioritized list, corresponding to the SIM 2, of a second plurality of antennas. In some aspects, the UE 610 may determine that a performance of the first antenna satisfies a performance criterion based at least in part on a performance of a currently associated antenna.

As indicated above, FIG. 6 is provided as an example. Other examples may differ from what is described with regard to FIG. 6.

Figures 7A, 7B, 7C:
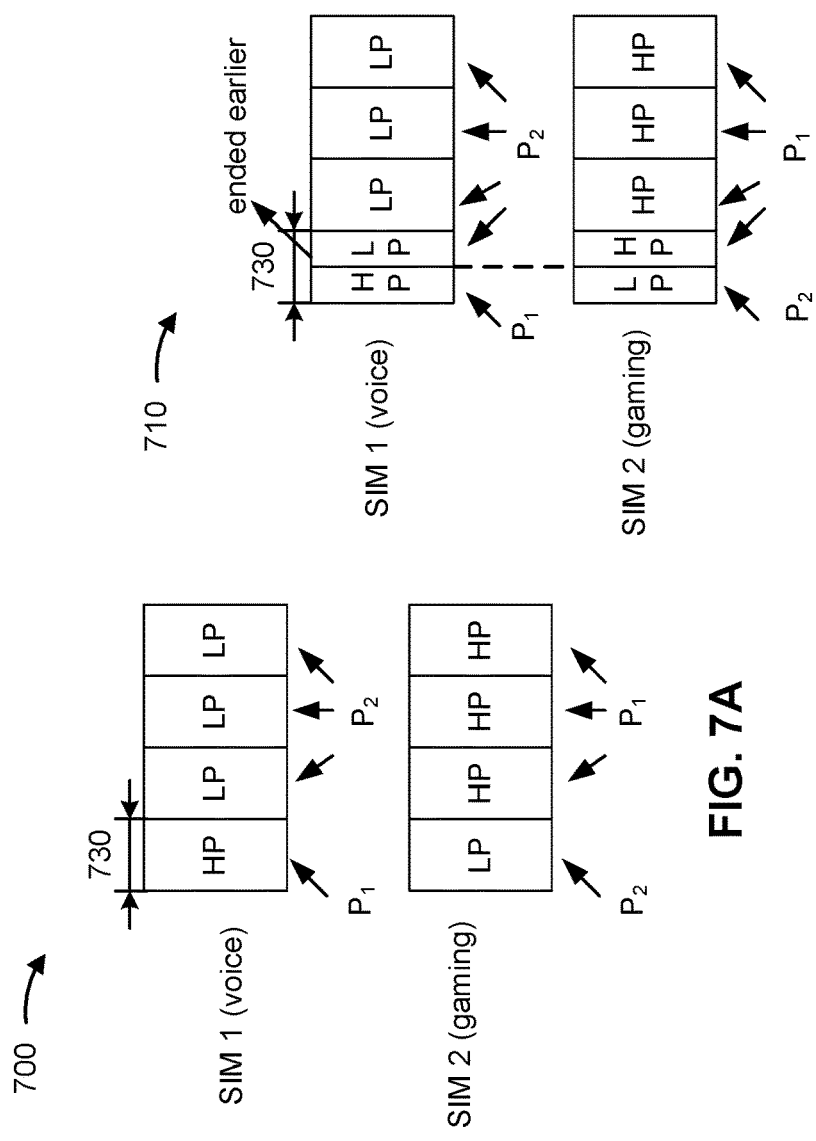
FIGS. 7A-7C are diagrams illustrating examples associated with managing transmission power of a multiple SIM UE, in accordance with the present disclosure.

FIGS. 7A-7C are diagrams illustrating respective examples 700, 710, and 720 associated with managing transmission power of a multiple SIM UE, in accordance with the present disclosure. Examples 700, 710, and 720 illustrate power management by adjustment based at least in part on flipping priority level power adjustment allocations. For example, as shown in example 700, the SIM 1 may have, for a first power adjustment interval 730, a high priority (HP) designation (during which a first power level P1 is applied), and for three subsequent power adjustment intervals, a low priority (LP) designation (during which a second power level P2 is applied). The SIM 2's allocations may be the opposite, as shown. A power adjustment interval may last any configured amount of time. For example, a power adjustment interval may be 10 ms long and the pattern of priority designation flipping may repeat after a number of power adjustment intervals (four in the illustrated example).

Also, as shown in example 700, the priority designations HP and LP may flip between the SIM 1 and the SIM 2, even though the respective services provided by the SIMS do not change. For example, as shown, SIM 1 may be providing a voice service and SIM 2 may provide a gaming service. In this manner, the gaming service, while having a lower priority than the voice service, may be allocated higher power levels for more of the time since a voice service may not transmit data as often as a gaming service, which may improve efficiency and have a positive effect on UE performance. In some aspects, the UE may be configured to dynamically adjust the power levels based at least in part on trigger events, which may facilitate even more flexible operation.

For example, in some aspects, where the SIM 1 uses a first antenna of an antenna group to transmit a first transmission and the SIM 2 uses a second antenna of the antenna group to transmit a second transmission, the UE may determine a first maximum power level corresponding to a high priority service and a second maximum power level corresponding to a low priority service. The UE may apply the first maximum power level to the SIM 1 for a first power adjustment interval and the second maximum power level to the SIM 2 for the first power adjustment interval. The UE may determine an occurrence of a power adjustment point and apply, based at least in part on determining the occurrence of the power adjustment point, the first maximum power level to the SIM 2 for a second power adjustment interval and the second maximum power level to the SIM 1 for the second power adjustment interval.

In some aspects, the power adjustment point may be an end point of a power adjustment interval. In some aspects, the power adjustment point may be a point at which a transmission associated with an HP designation ends. For example, as shown by example 710, a voice transmission may end prior to an end point of the first power adjustment interval 730. In that case, the UE may flip the priority designations and, thus, the power level allocations. Similarly, as shown by example 720, a transmission may end after an end point of a power adjustment interval, in which case a priority designation may be extended beyond the power adjustment interval.

In some aspects, the UE may adjust a time length corresponding to at least one power adjustment interval. In some aspects, the UE may configure the power adjustment point. In some aspects, the UE may configure an additional one or more power adjustment points. In some aspects, for example, the power adjustment point may be associated with a time duration (e.g., 10 ms), a slot boundary, a frame boundary, and/or a number of symbols, among other examples.

In some aspects, the UE may adjust the first and second power levels, even during flipping priority designations. For example, the UE may apply the first maximum power level to the SIM 1 for a first power adjustment interval and the second maximum power level to the SIM 2 for the first power adjustment interval. Based at least in part on determining an occurrence of a power adjustment point, the UE may apply a third maximum power level to the SIM 2 for a second power adjustment interval and a fourth maximum power level to the SIM 1 for the second power adjustment interval. In some aspects, the third maximum power level may correspond to a first RAT and the fourth maximum power level may correspond to a second RAT.

As indicated above, FIGS. 7A-7C are provided as examples. Other examples may differ from what is described with regard to FIGS. 7A-7C.

Figure 8:
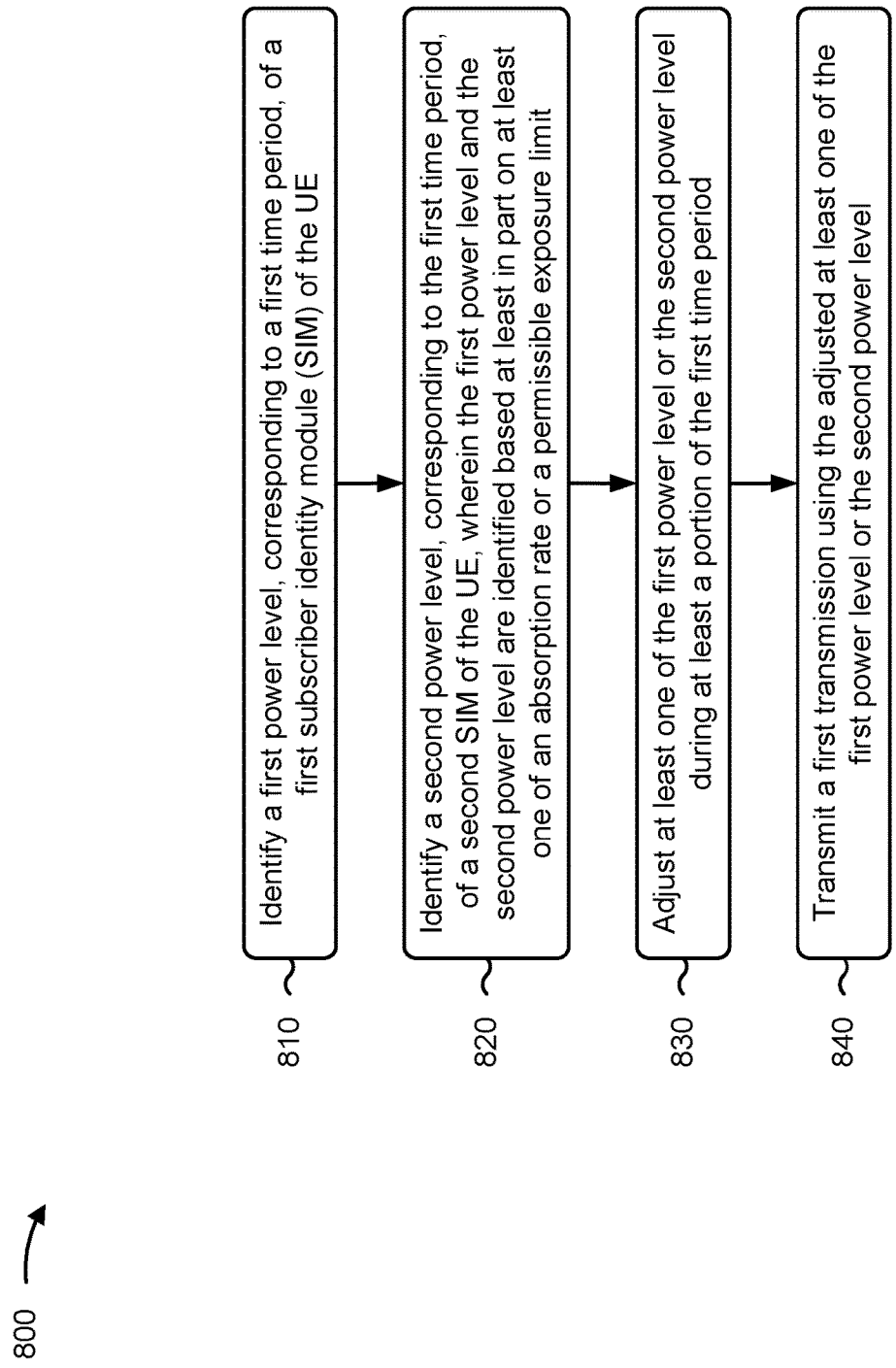
FIG. 8 is a diagram illustrating an example process associated with managing transmission power of a multiple SIM UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with techniques for managing transmission power of a multiple SIM UE.

As shown in FIG. 8, in some aspects, process 800 may include identifying a first power level, corresponding to a first time period, of a first SIM of the UE (block 810). For example, the UE (e.g., using power management component 1110, depicted in FIG. 11) may identify a first power level, corresponding to a first time period, of a first SIM of the UE, as described above.

As further shown in FIG. 8, in some aspects, process 800 may include identifying a second power level, corresponding to the first time period, of a second SIM of the UE, wherein the first power level and the second power level are identified based at least in part on at least one of an absorption rate or a permissible exposure limit (block 820). For example, the UE (e.g., using power management component 1110, depicted in FIG. 11) may identify a second power level, corresponding to the first time period, of a second SIM of the UE, wherein the first power level and the second power level are identified based at least in part on at least one of an absorption rate or a permissible exposure limit, as described above.

As further shown in FIG. 8, in some aspects, process 800 may include adjusting at least one of the first power level or the second power level during at least a portion of the first time period (block 830). For example, the UE (e.g., using power management component 1110, depicted in FIG. 11) may adjust at least one of the first power level or the second power level during at least a portion of the first time period, as described above.

As further shown in FIG. 8, in some aspects, process 800 may include transmitting a first transmission using the adjusted at least one of the first power level or the second power level (block 840). For example, the UE (e.g., using transmission component 1104, depicted in FIG. 11) may transmit a first transmission using the adjusted at least one of the first power level or the second power level, as described above.

Process 800 may include additional aspects, such as any single aspect or any combination of aspects described below and/or in connection with one or more other processes described elsewhere herein.

In a first aspect, process 800 includes determining that a prior aggregated power fails to satisfy an emission condition associated with the at least one of the absorption rate or the permissible exposure limit, wherein adjustment of the at least one of the first power level or the second power level comprises applying, based at least in part on determining that the prior aggregated power fails to satisfy the emission condition, a power backoff to at least one of the first SIM or the second SIM.

In a second aspect, alone or in combination with the first aspect, application of the power backoff comprises determining a first priority level associated with the first transmission, and determining a second priority level associated with a second transmission, wherein the first priority level is higher than the second priority level, wherein applying the power backoff comprises applying the power backoff based at least in part on determining the first priority level and the second priority level.

In a third aspect, alone or in combination with the second aspect, the first transmission comprises an active voice transmission.

In a fourth aspect, alone or in combination with the third aspect, the second transmission comprises at least one of a delay-sensitive gaming transmission, a voice on-hold transmission, or an internet data transmission.

In a fifth aspect, alone or in combination with the fourth aspect, a priority level associated with the voice on-hold transmission is higher than a priority level associated with the internet data transmission, a priority level associated with the delay-sensitive gaming transmission is higher than the priority level associated with the voice on-hold transmission, and a priority level associated with the active voice transmission is higher than the priority level associated with the delay-sensitive gaming transmission.

In a sixth aspect, alone or in combination with one or more of the second through fifth aspects, the first transmission corresponds to at least one of a wireless wide area network, wherein the second transmission corresponds to a wireless local area network, a primary component carrier, wherein the second transmission corresponds to a secondary component carrier, or a first frequency range, wherein the second transmission corresponds to a second frequency range.

In a seventh aspect, alone or in combination with one or more of the second through sixth aspects, determination of the first priority level associated with the first transmission comprises determining the first priority level based at least in part on at least one of a determination that at least one of an uplink event or an uplink grant comprises at least one of a high priority signaling event, a carrier-sanctioned voice transmission, a carrier-sanctioned video telephony transmission, a conversational video transmission, internet data, best-effort data, over-the-top data, multimedia messaging service data, short message service data, gaming data, extending reality data, or a shared transmission.

In an eighth aspect, alone or in combination with one or more of the first through seventh aspects, the first time period comprises an emission control loop interval.

In a ninth aspect, alone or in combination with one or more of the first through eighth aspects, process 800 includes performing an asynchronous emission condition evaluation based at least in part on detecting an occurrence of an asynchronous evaluation trigger event.

In a tenth aspect, alone or in combination with the ninth aspect, the asynchronous evaluation trigger event comprises a service priority switch event, and detection of the occurrence of the asynchronous evaluation trigger event comprises determining that the first SIM switched from providing a first service having a first priority level to a second service having a second priority level that is different than the first priority level, and determining that the second SIM switched from providing a third service having the second priority level to a fourth service having the first priority level.

In an eleventh aspect, alone or in combination with the tenth aspect, the first priority level is a high priority level and the second priority level is a low priority level.

In a twelfth aspect, alone or in combination with one or more of the tenth through eleventh aspects, a power class associated with a band used by the first SIM is the same as or different than a power class associated with a band used by the second SIM.

In a thirteenth aspect, alone or in combination with one or more of the ninth through twelfth aspects, detection of the occurrence of the asynchronous evaluation trigger event comprises detecting the occurrence of the asynchronous evaluation trigger event within a synchronous evaluation window.

In a fourteenth aspect, alone or in combination with one or more of the first through thirteenth aspects, the first SIM uses a first antenna of an antenna group to transmit the first transmission, wherein the second SIM uses a second antenna of the antenna group to transmit a second transmission, and determination of the first power level and the second power level comprises determining a first maximum power level corresponding to a first power adjustment interval comprising a high priority power adjustment interval, and determining a second maximum power level corresponding to a second power adjustment interval comprising a low priority power adjustment interval.

In a fifteenth aspect, alone or in combination with the fourteenth aspect, process 800 includes applying the first maximum power level to the first SIM for the first power adjustment interval, applying the second maximum power level to the second SIM for the first power adjustment interval, determining an occurrence of a power adjustment point, applying, based at least in part on determining the occurrence of the power adjustment point, the first maximum power level to the second SIM for the second power adjustment interval, and applying, based at least in part on determining the occurrence of the power adjustment point, the second maximum power level to the first SIM for the second power adjustment interval.

In a sixteenth aspect, alone or in combination with the fifteenth aspect, process 800 includes adjusting a time length corresponding to at least one of the first power adjustment interval or the second power adjustment interval.

In a seventeenth aspect, alone or in combination with one or more of the fifteenth through sixteenth aspects, process 800 includes configuring the power adjustment point.

In an eighteenth aspect, alone or in combination with the seventeenth aspect, process 800 includes configuring at least one additional power adjustment point.

In a nineteenth aspect, alone or in combination with one or more of the seventeenth through eighteenth aspects, configuration of the power adjustment point comprises associating the power adjustment point with a slot boundary.

In a twentieth aspect, alone or in combination with one or more of the fifteenth through nineteenth aspects, determination of the occurrence of the power adjustment point comprises determining an ending point of the first power adjustment interval based at least in part on a timing configuration, wherein the timing configuration indicates at least one high priority power adjustment interval allocated to the first SIM, wherein the at least one high priority power adjustment interval allocated to the first SIM corresponds to at least one low priority power adjustment interval allocated to the second SIM, and at least one low priority power adjustment interval allocated to the first SIM, wherein the at least one low priority power adjustment interval allocated to the first SIM corresponds to at least one high priority power adjustment interval allocated to the second SIM.

In a twenty-first aspect, alone or in combination with one or more of the fourteenth through twentieth aspects, process 800 includes applying the first maximum power level to the first SIM for the first power adjustment interval, applying the second maximum power level to the second SIM for the first power adjustment interval, determining an occurrence of a power adjustment point, applying, based at least in part on determining the occurrence of the power adjustment point, a third maximum power level to the second SIM for the second power adjustment interval, and applying, based at least in part on determining the occurrence of the power adjustment point, a fourth maximum power level to the first SIM for the second power adjustment interval.

In a twenty-second aspect, alone or in combination with the twenty-first aspect, the third maximum power level corresponds to a first RAT, and the fourth maximum power level corresponds to a second RAT.

In a twenty-third aspect, alone or in combination with one or more of the first through thirteenth aspects, the first SIM uses a first antenna of a first antenna group to transmit the first transmission, wherein the second SIM uses a second antenna of a second antenna group to transmit a second transmission, and identifying the first power level and the second power level comprises determining a first maximum power level corresponding to the first SIM, and determining a second maximum power level corresponding to the second SIM.

In a twenty-fourth aspect, alone or in combination with the twenty-third aspect, process 800 includes applying the first maximum power level to the first SIM for a first power adjustment interval, wherein the first SIM provides a service having a high priority during the first power adjustment interval, applying the second maximum power level to the second SIM for the first power adjustment interval, wherein the second SIM provides a service having a low priority during the first power adjustment interval, applying the first maximum power level to the first SIM for a second power adjustment interval, wherein the first SIM provides the service having the high priority during the second power adjustment interval, and applying the second maximum power level to the second SIM for the second power adjustment interval, wherein the second SIM provides the service having the low priority during the second power adjustment interval.

In a twenty-fifth aspect, alone or in combination with one or more of the first through twenty-fourth aspects, identifying the first power level and the second power level comprises allocating the first power level to the first SIM during a prior high priority power adjustment interval, referencing an energy profile associated with the prior high priority power adjustment interval, determining an amount of transferrable energy based at least in part on referencing the energy profile, and allocating the second power level to the second SIM for a second transmission, wherein the second power level comprises the amount of transferrable energy.

In a twenty-sixth aspect, alone or in combination with the twenty-fifth aspect, determining the amount of transferrable energy comprises determining a percentage of a remaining energy associated with the first SIM during the prior high priority power adjustment interval.

In a twenty-seventh aspect, alone or in combination with the twenty-sixth aspect, process 800 includes implementing a configuration that indicates the percentage.

In a twenty-eighth aspect, alone or in combination with one or more of the twenty-sixth through twenty-seventh aspects, process 800 includes reserving a reserve amount of the remaining energy for one or more usages corresponding to the first SIM.

In a twenty-ninth aspect, alone or in combination with one or more of the twenty-fifth through twenty-eighth aspects, process 800 includes updating the at least one of the first power level and the second power level using an iterative updating procedure based at least in part on one or more updating parameters.

In a thirtieth aspect, alone or in combination with the twenty-ninth aspect, the one or more updating parameters comprise at least one of an updated amount of transferrable energy, an amount of transferrable energy used by the second SIM during the second transmission, a power class associated with the first SIM, a power class associated with the second SIM, a configured maximum power of the first SIM, a configured maximum power of the second SIM, a spatial relationship between an antenna used by the first SIM and an antenna used by the second SIM, a RAT used by the first SIM, an energy efficiency associated with the RAT used by the first SIM, a spectrum efficiency associated with the RAT used by the first SIM, a RAT used by the second SIM, an energy efficiency associated with the RAT used by the second SIM, or a spectrum efficiency associated with the RAT used by the second SIM.

In a thirty-first aspect, alone or in combination with one or more of the first through thirtieth aspects, identifying the first power level and the second power level comprises associating the first SIM with a first antenna, wherein the first power level is associated with the first antenna, and associating the second SIM with a second antenna, wherein the second power level is associated with the second antenna.

In a thirty-second aspect, alone or in combination with the thirty-first aspect, the first antenna is associated with a first antenna group, and the second antenna is associated with a second antenna group.

In a thirty-third aspect, alone or in combination with one or more of the thirty-first through thirty-second aspects, process 800 includes selecting at least one of the first antenna or the second antenna from a prioritized list of a plurality of antennas.

In a thirty-fourth aspect, alone or in combination with one or more of the thirty-first through thirty-third aspects, the first antenna is included in a first prioritized list, corresponding to the first SIM, of a first plurality of antennas, and the second antenna is included in a second prioritized list, corresponding to the second SIM, of a second plurality of antennas.

In a thirty-fifth aspect, alone or in combination with one or more of the thirty-first through thirty-fourth aspects, process 800 includes determining that a performance of the first antenna satisfies a performance criterion based at least in part on a performance of a currently associated antenna.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
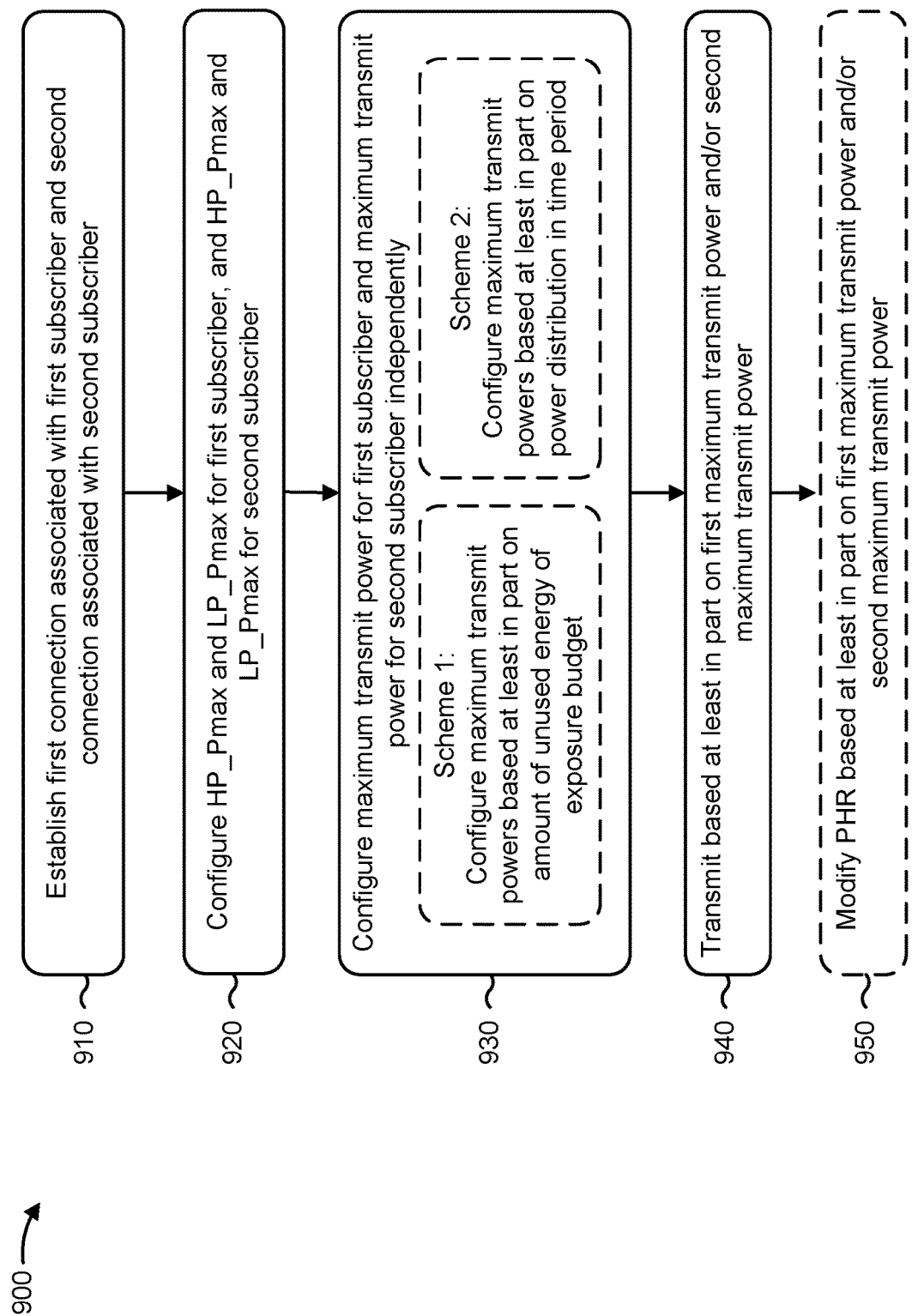
FIG. 9 is a diagram illustrating an example of independent power control for multiple SIMS, in accordance with the present disclosure.

FIG. 9 is a diagram illustrating an example 900 of independent power control for multiple SIMS, in accordance with the present disclosure. The operations described with regard to example 900 may be performed by a UE (e.g., UE 120), a power management component of the UE, or the like. In example 900, the UE is associated with a first SIM and a second SIM. At a given time, one of the first SIM or the second SIM may be a default data SIM (DDS) for the UE.

As shown in FIG. 9, and by reference number 910, the UE may establish a first connection and a second connection. The first connection may be associated with the first SIM. The second connection may be associated with the second SIM. Thus, the UE may communicate in a DSDA fashion using the first SIM and the second SIM.

As shown by reference number 920, the UE may configure a first initial maximum transmit power (HP_Pmax, sometimes referred to herein as a first priority initial maximum transmit power) for the first SIM and a first decreased transmit power (LP_Pmax, sometimes referred to herein as a second priority initial maximum transmit power) for the first SIM. Furthermore, the UE may configure a second initial maximum transmit power (HP_Pmax, sometimes referred to herein as a third priority initial maximum transmit power) for the second SIM and a second decreased transmit power (LP_Pmax, sometimes referred to herein as a fourth priority initial maximum transmit power) for the second SIM. The first decreased transmit power may be decreased relative to (e.g., lower than) the first initial maximum transmit power. The second decreased transmit power may be decreased relative to (e.g., lower than) the second initial maximum transmit power. The initial maximum transmit powers and the decreased transmit powers may facilitate the sharing of energy budget (e.g., an energy limit) between the first SIM and the second SIM. For example, at a time when the first SIM is transmitting at the first initial maximum transmit power, the second SIM may transmit at the second decreased transmit power. At a time when the first SIM is transmitting at the first decreased transmit power, the second SIM may transmit at the second initial maximum transmit power. For example, a priority pattern (e.g., a predefined priority pattern) may indicate which SIM is to transmit at a maximum transmit power (as opposed to a decreased transmit power) at a given time. The priority pattern may indicate whether a given SIM is associated with a higher service priority or a lower service priority at a given time. An uplink slot in which a SIM is associated with a higher service priority is referred to herein as a high priority slot. An uplink slot in which a SIM is associated with a lower service priority is referred to herein as a low priority slot.

The UE may determine the first initial maximum transmit power, the second initial maximum transmit power, the first decreased transmit power, and/or the second decreased transmit power based at least in part on an energy limit (sometimes referred to herein as a compliance budget or an energy budget) of the UE. For example, the energy limit may be a compliance budget. In some aspects, the UE may determine an initial maximum transmit power and/or a decreased transmit power based at least in part on a type of SIM. For example, the UE may request an energy budget for data transmission based at least in part on which SIM is a DDS SIM. For example, the UE may take into account the SIM type of a SIM and may request energy budget for data transmission only for the DDS SIM.

As shown by reference number 930, the UE may configure a first maximum transmit power for the first SIM and a second maximum transmit power for the second SIM. The first maximum transmit power may be based at least in part on the first initial maximum transmit power and/or the first decreased transmit power, and may be associated with the first connection (e.g., may be used to control transmit power on the first connection). For example, the first initial maximum transmit power and/or the first decreased transmit power may be used to derive the parameters used to determine the first maximum transmit power (such as an initial balance, an amount of energy deposited in the bank, and so on). The second maximum transmit power may be based at least in part on the second initial maximum transmit power and/or the second decreased transmit power, and may be associated with the second connection (e.g., may be used to control transmit power on the second connection). For example, the UE may determine a maximum transmit power on an ongoing basis, such as by modifying an initial maximum transmit power, selecting one of an initial maximum transmit power or a decreased transmit power for a transmission, determining a maximum transmit power that is between the initial maximum transmit power and the decreased transmit power for a SIM, or the like. In some aspects, a maximum transmit power determined in connection with reference number 930 may be based at least in part on an energy limit (e.g., compliance budget) of the UE. The techniques described herein can be used to determine the maximum transmit powers for the first SIM and the second SIM based at least in part on the initial maximum transmit powers associated with the first SIM and the second SIM. In some aspects, the UE may configure the first maximum transmit power and the second maximum transmit power without energy transfer between the first SIM and the second SIM.

In some aspects, the UE may configure a maximum transmit power based at least in part on an amount of unused energy of a energy limit (referred to as Scheme 1). Scheme 1 may be referred to as a "save before use" scheme. In some aspects, the UE may count non-granted uplink slots (sometimes referred to as slots associated with no grant) and/or under-granted uplink slots (sometimes referred to as a grant using less than all of an energy associated with a corresponding slot). A non-granted uplink slot is an uplink slot in which no grant for transmission by the UE is received. An under-granted uplink slot is an uplink slot in which any grants received do not utilize an entirety of a energy limit associated with the uplink slot. For example, a UE may have a certain amount of energy that can be transmitted in an uplink slot while complying with SAR and MPE restrictions. The certain amount of energy may be higher in an uplink slot associated with a maximum transmit power (e.g., HP_Pmax) than in an uplink slot associated with a decreased transmit power (e.g., LP_Pmax). The UE may store information indicating an amount of energy conserved based at least in part on non-granted uplink slots and/or under-granted uplink slots. For an uplink slot that is configured with a decreased transmit power (e.g., LP_Pmax), the UE may determine (e.g., based at least in part on the stored information) whether sufficient energy has been conserved to allow for transmission in the uplink slot at the maximum transmit power (e.g., HP_Pmax). The UE may configure the transmit power for the uplink slot as the maximum transmit power if sufficient energy has been conserved to allow for transmission in the uplink slot at the maximum transmit power, and may configure the transmit power for the uplink slot as the decreased transmit power if insufficient energy has been conserved to allow for transmission in the uplink slot at the maximum transmit power. In some aspects, the UE may perform Scheme 1 separately (e.g., independently) for each SIM of the UE.

An example algorithm implementing Scheme 1 for a SIM is provided below. In the example, LP_Pmax is normalized based at least in part on HP_Pmax. The UE maintains a counter indicating available energy based at least in part on un-granted and under-granted uplink slots. The UE determines a maximum transmit power limitation (MTPL) for an uplink transmission based at least in part on the counter. The example algorithm includes only non-granted uplink slots, though in some aspects, Scheme 1 also takes into account under-granted uplink slots.

Upon updating Pmax_LP and/or Pmax_HP
  power_factor_1p=Pmax_1p/pmax_hp (in linear value);
  power_factor_hp=1;
The UE may maintain a counter (count_noTx) which is changed based at least in part on Tx activity
  Initialize: count_noTx=0.
When there is no transmission (physical uplink control channel, physical uplink shared or sounding reference) scheduled for a configured uplink slot associated with a decreased transmit power (low priority)
  count_noTx=count_noTx+power_factor_1p;
When there is no transmission scheduled for a configured uplink slot associated with a maximum transmit power (high priority)
  count_noTx=count_noTx+power_factor_hp;
Count_noTx shall be reset if synchronous and/or asynchronous limits for SAR/MPE compliance are updated
Configuring maximum transmit power (i.e., determining MTPL) based at least in part on counter:
  When there is a transmission scheduled for a configured uplink slot associated with a decreased transmit power (low priority)

```
If (count_noTx > 1) && (P_calc_current_tx > Pmax_LP)
   SAR_MTPL = Pmax_HP;
   count_noTx = count_noTx − power_factor_hp;
Else
   SAR_MTPL = Pmax_LP;
```

When there is a transmission scheduled for a configured uplink slot associated with a maximum transmit power (high priority)
  SAR_MTPL=Pmax_HP;

In the above pseudocode, P_calc_current_tx represents a desired maximum transmit power level calculated for a corresponding uplink slot.

In some aspects, the UE may configure a maximum transmit power based at least in part on a communication to be transmitted by the UE. For example, the UE may use conserved power (e.g., may assign a maximum transmit power based at least in part on a previous ungranted or under-granted uplink slot) for a particular type of communication. In some aspects, the particular type of communication may include control signaling (e.g., uplink control information, an acknowledgment or negative acknowledgment, transmission control protocol (TCP) control signaling, or the like), a communication associated with a threshold priority value, or the like. In some aspects, the UE may determine the maximum transmit power only for communications of the particular type (e.g., the UE may not determine a maximum transmit power for a low priority uplink slot unless the particular type of communication is to be transmitted in the low priority uplink slot). Thus, the UE may increase transmit power for certain types of communications, which improves reliability of such communications.

In some aspects, the UE may configure a maximum transmit power based at least in part on a power distribution in a time period (referred to as Scheme 2). In Scheme 2, the UE may adjust the maximum transmit power within a value range (such as lower than a power class value of the UE). A power class value is a value identifying a maximum transmit power of a UE over an NR channel bandwidth. Examples include Power Classes 1, 2, 3, and 4 defined by 3GPP. In this way, the UE may maximize transmit power and transmit duration with a controlled budget spread over time. It should be noted that Scheme 1 and Scheme 2 can be combined, in some aspects. For example, a UE may determine whether the UE can transmit at a higher transmit power (e.g., HP_Pmax) in a lower priority time period and may dynamically adjust HP_Pmax and LP_Pmax on an ongoing basis.

In Scheme 2, the UE may maintain two "banks" per SIM: a high priority bank and a low priority bank. A bank may be associated with an energy budget. The energy budget (sometimes referred to as a balance) associated with a bank may map to an adjusted maximum transmit power, such as based at least in part on the relationship between energy, power, and time.

The UE may determine a time distribution (sometimes referred to as a budget schedule) that allocates portions of a total energy budget (E_total) to a set of time chunks $d_1 \ldots d_N$. The set of time chunks may be distributed over a compliance window of T seconds, such as a compliance window associated with SAR or MPE compliance. In DSDA, each SIM has a maximum transmit power associated with high priority transmission (HP_Pmax) and a decreased transmit power associated with low priority transmission (LP_Pmax). Therefore, E_total includes an energy budget associated with high priority transmission (E_total_HP) and an energy budget associated with low priority transmission (E_total_LP). The UE may allocate energy of the energy budget to time chunks based at least in part on a factor p. For example, the UE may determine values of $p_i$ for each $d_i$ of $d_1 \ldots d_N$, and may determine the time distribution as shown in Table 1:

| Time chunk | $d_i$ | $d_1 + d_2 + \ldots + d_N = T$ |
|---|---|---|
| Energy budget | $E_{i\_HP} = E\_total\_HP *$ $p_{i\_HP}$, $E_{i\_LP} = E\_total\_LP *$ $p_{i\_LP}$ | $p_{1\_HP} + p_{2\_HP} + \ldots +$ $p_{N\_HP} = 1$, $p_{1\_LP} + p_{2\_LP} + \ldots +$ $p_{N\_LP} = 1$ |

As mentioned above, the UE may determine values of $p_i$. In some aspects, the UE may use a prediction-based technique to determine values of $p_i$. For example, the UE may predict one or more time chunks in which uplink transmission may occur (e.g., based at least in part on a predicted traffic pattern), and may assign a larger $p_i$ or a non-zero $p_i$ to the one or more time chunks. The prediction-based technique may be particularly beneficial for uplink transmissions with a predictable traffic pattern, such as voice calls. Additionally, or alternatively, the UE may use a randomization-based technique to determine values of $p_i$ based at least in part on a randomized distribution, which may be advantageous for activities without a predictable pattern such as gaming traffic or internet data. For example, the UE may determine a randomized value of $p_i$ corresponding to each time chunk $d_i$. As another example, the UE may determine time chunks having a randomized length. Additionally, or alternatively, the UE may allocate an equal $p_i$ for each time chunk $d_1$, and/or each time chunk $d_i$ may have an equal length (e.g., T/N for a time window of length T and N time chunks). Additionally, or alternatively, the UE may allocate $p_i$ based at least in part on a priority pattern associated with the first SIM and the second SIM. For example, the UE may allocate larger values of $p_i$ for high priority time intervals and smaller values of $p_i$ for low priority time intervals. In some aspects, the UE may use a combination of two or more of the above-described techniques to determine $p_i$. Additionally, or alternatively, the UE may switch between two or more of the above-described techniques, such as based at least in part on a service type or an activity type of the UE.

At the beginning of each time chunk $d_i$, the UE may add energy budget equal to $E_{i\_HP}$ and $E_{i\_LP}$, to the bank associated with high priority transmission and the bank associated with low priority transmission, respectively. Thus, the time distribution, as defined by $p_i$ and $d_i$, controls how much energy is available for transmission at a given time. For an upcoming time chunk $d_i$, the UE may generate a request (E_request_i) based at least in part on the total budget associated with the upcoming time chunk. For example, the UE may generate the request to provide sufficient transmit power for all uplink transmissions during $d_i$. In some aspects, E_request_i may be based at least in part on an estimation of required energy. In some aspects, E_request_i may always use the worst case (that is, based at least in part on a mapping of Pmax to a power class value). E_request_i may not have a dependency on the priority level associated with a time period.

The UE may grant energy from the bank associated with high priority transmission, or the bank associated with low priority transmission, for a time chunk based at least in part on the priority pattern of the UE. For example, at a time associated with high priority transmission, if E_request_i≤HP_balance_i, then the UE may grant the full request (E_request_i), and if E_request_i>HP_balance_i, then the UE may grant HP_balance_i. As another example, at a time associated with low priority transmission, if E_request_i≤LP_balance_i, then the UE may grant the full request (E_request_i), and if E_request_i>LP_balance_i, then the UE may grant LP_balance_i.

The UE may update the bank associated with high priority transmission and/or the bank associated with low priority transmission based at least in part on used energy (represented by E_usage_i) after each uplink transmission. For example, for a time chunk $d_i$:

If E_usage_i<E_request_i:
   HP_balance_i=HP_balance_i+(E_request_i−E_usage_i);
   LP_balance_i=LP_balance_i+(E_request_i−E_usage_i);
Else:
   HP_balance_i and LP_balance_i stay unchanged.

The UE may determine a maximum transmit power for an uplink transmission in accordance with the granted energy (E_request_i, HP_balance_i, or LP_balance_i) for the uplink transmission, such as based at least in part on whether the uplink transmission is in a high priority slot or a low priority slot. In this way, the UE may update Pmax (e.g., the maximum transmit power) over time based at least in part on adjusting the balances in the two banks. As mentioned above, the UE may perform Scheme II separately for each SIM of the UE.

As shown by reference number 940, the UE may transmit based at least in part on at least one of the first maximum transmit power or the second maximum transmit power. For example, the UE may transmit a first communication associated with the first SIM at a first maximum transmit power (as determined, for example, using Scheme I or Scheme II). As another example, the UE may transmit a second communication associated with the second SIM at a second maximum transmit power (as determined, for example, using Scheme I or Scheme II).

As shown by reference number 950, in some aspects, the UE may modify a power headroom (PHR) based at least in part on the first maximum transmit power and/or the second maximum transmit power. For example, as mentioned above, for DSDA, two levels of maximum transmit power (in accordance with a priority pattern) are used on each SIM to provide for SAR/MPE compliance. The usage of two levels of maximum transmit power can result in potentially fast MTPL changes on the two SIMS. For example, with a priority pattern repeating every 40 ms, MTPLs of the two SIMs may change twice every 40 ms. PHR may be calculated based at least in part on an instantaneous MTPL of the UE, and may be reported by the UE. The network may use the UE's PHR to perform packet scheduling, link adaptation, path loss estimation, or the like. With PHR calculated based at least in part on the instantaneous MTPL, the network can have trouble keeping up with the UE's pace of MTPL change (e.g., there may be delays in converging with UE's fast-changing PHR levels), and may therefore grant resources incorrectly (e.g., based at least in part on an outdated PHR). This in turn can lead to increased block error rate on the UE side, impacting performance.

The UE may selectively modify a PHR (or may not modify the PHR) based at least in part on a high priority MTPL (MTPL_HP) and a low priority MTPL (MTPL_LP). For example, the UE may selectively modify the PHR based at least in part on whether MTPL_HP and MTPL_LP differ by at least a threshold amount. The threshold amount may be configured, for example, via a PHR configuration (such as in a parameter phr-Tx-PowerFactorChange). In some aspects, modifying the PHR may be referred to as filtering the PHR. In some aspects, if MTPL_HP−MTPL_LP≤threshold_phr, the UE may report a PHR determined using MTPL_HP. If MTPL_HP−MTPL_LP>threshold_phr, the UE may report a modified PHR. For example, the UE may report a PHR calculated using a weighted sum of MTPL_HP and MTPL_LP. In one example, the weights (e.g., default weights) may be 0.25*MTPL_LP+0.75*MTPL_HP. A weight can be between 0 and 1 (inclusive).

In some aspects, the UE may modify the PHR based at least in part on whether concurrent transmission (e.g., transmissions associated with the first SIM and the second SIM) is occurring. For example, if no concurrent transmission is occurring, the UE may use MTPL_HP to determine the PHR. In some aspects, the UE may modify the PHR based at least in part on whether a voice call is ongoing. For example, the UE may use MTPL_HP to determine the PHR if there will be no transmission during one or more low priority durations defined by a priority pattern.

As indicated above, FIG. 9 is provided as an example. Other examples may differ from what is described with regard to FIG. 9.

Figure 10:
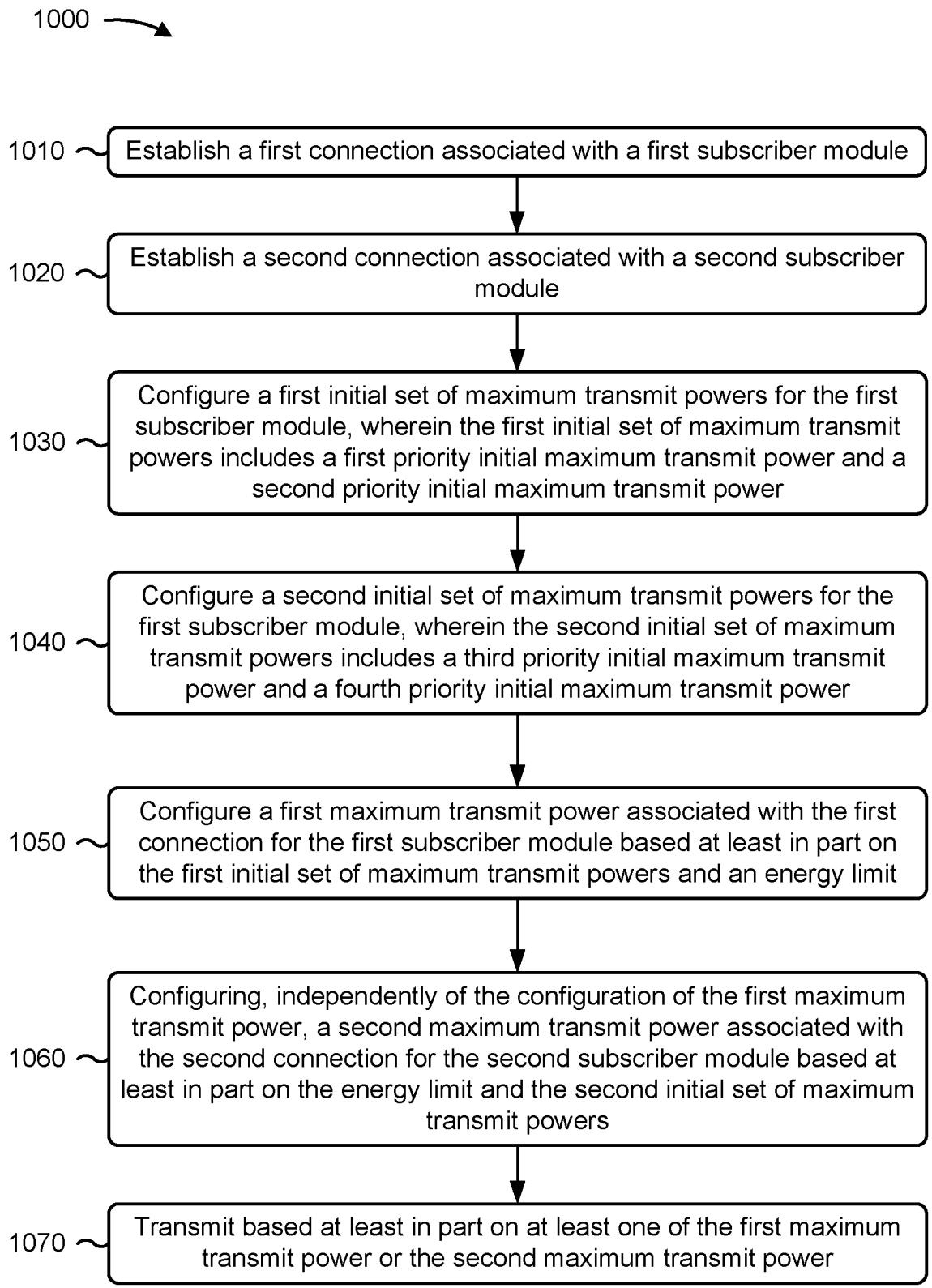
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with power control for dual subscribers.

As shown in FIG. 10, in some aspects, process 1000 may include establishing a first connection associated with a first subscriber module (block 1010). For example, the UE (e.g., using communication manager 140 and/or connection component 1108, depicted in FIG. 11) may establish a first connection associated with a first subscriber module, as described above.

As further shown in FIG. 10, in some aspects, process 1000 may include establishing a second connection associated with a second subscriber module (block 1020). For example, the UE (e.g., using communication manager 140 and/or connection component 1108, depicted in FIG. 11) may establish a second connection associated with a second subscriber module, as described above.

As further shown in FIG. 10, in some aspects, process 1000 may include configuring a first initial set of maximum transmit powers for the first subscriber module, wherein the first initial set of maximum transmit powers includes a first priority initial maximum transmit power and a second priority initial maximum transmit power (block 1030). For example, the UE (e.g., using communication manager 140 and/or power management component 1110, depicted in FIG. 11) may configure a first initial set of maximum transmit powers for the first subscriber module, wherein the first initial set of maximum transmit powers includes a first priority initial maximum transmit power (e.g., HP_Pmax for the first subscriber) and a second priority initial maximum transmit power (e.g., LP_Pmax for the first subscriber), as described above.

As further shown in FIG. 10, in some aspects, process 1000 may include configuring a second initial set of maximum transmit powers for the first subscriber module, wherein the second initial set of maximum transmit powers includes a third priority initial maximum transmit power and a fourth priority initial maximum transmit power (block 1040). For example, the UE (e.g., using communication manager 140 and/or power management component 1110, depicted in FIG. 11) may configure a second initial set of maximum transmit powers for the first subscriber module, wherein the second initial set of maximum transmit powers includes a third priority initial maximum transmit power (e.g., HP_Pmax for the second subscriber) and a fourth priority initial maximum transmit power (e.g., LP_Pmax for the second subscriber), as described above.

As further shown in FIG. 10, in some aspects, process 1000 may include configuring a first maximum transmit power associated with the first connection for the first subscriber module based at least in part on the first initial set of maximum transmit powers and an energy limit (block 1050). For example, the UE (e.g., using communication manager 140 and/or power management component 1110, depicted in FIG. 11) may configure a first maximum transmit power associated with the first connection for the first subscriber module based at least in part on the first initial set of maximum transmit powers and an energy limit, as described above.

As further shown in FIG. 10, in some aspects, process 1000 may include configuring, independently of the configuration of the first maximum transmit power, a second maximum transmit power associated with the second connection for the second subscriber module based at least in part on an energy limit and the second initial set of maximum transmit powers (block 1060). For example, the UE (e.g., using communication manager 140 and/or power management component 1110, depicted in FIG. 11) may configure, independently of the configuration of the first maximum transmit power, a second maximum transmit power associated with the second connection for the second subscriber module based at least in part on an energy limit and the second initial set of maximum transmit powers, as described above.

As further shown in FIG. 10, in some aspects, process 1000 may include transmitting based at least in part on at least one of the first maximum transmit power or the second maximum transmit power (block 1070). For example, the UE (e.g., using communication manager 140 and/or transmission component 1104, depicted in FIG. 11) may transmit based at least in part on at least one of the first maximum transmit power or the second maximum transmit power, as described above.

Process 1000 may include additional aspects, such as any single aspect or any combination of aspects described below and/or in connection with one or more other processes described elsewhere herein.

In a first aspect, configuring the first maximum transmit power and the second maximum transmit power is based at least in part on an amount of unused energy of the energy limit.

In a second aspect, alone or in combination with the first aspect, the amount of unused energy is based at least in part on a number of slots associated with no grant or a grant using less than all of an energy associated with a corresponding slot.

In a third aspect, alone or in combination with one or more of the first and second aspects, transmitting based at least in part on at least one of the first maximum transmit power or the second maximum transmit power further comprises transmitting, during a time period associated with the second priority initial maximum transmit power for the first subscriber module, a communication associated with the first subscriber module at the first priority initial maximum transmit power based at least in part on the amount of unused energy of the energy limit satisfying a threshold.

In a fourth aspect, alone or in combination with one or more of the first through third aspects, process 1000 includes transmitting, contemporaneously with the communication associated with the first subscriber module, a communication associated with the second subscriber module at the second maximum transmit power.

In a fifth aspect, alone or in combination with one or more of the first through fourth aspects, the communication is transmitted at the first maximum transmit power based at least in part on the communication being associated with a priority value that satisfies a threshold.

In a sixth aspect, alone or in combination with one or more of the first through fifth aspects, the first subscriber module is associated with a first amount of unused energy used to configure the first maximum transmit power and the second subscriber module is associated with a second amount of unused energy used to configure the second subscriber module.

In a seventh aspect, alone or in combination with one or more of the first through sixth aspects, configuring the first maximum transmit power and the second maximum transmit power further comprises configuring a power distribution in a time period based at least in part on the energy limit, the first initial set of maximum transmit powers, and the second initial set of maximum transmit powers.

In an eighth aspect, alone or in combination with one or more of the first through seventh aspects, the power distribution is based at least in part on a predicted traffic pattern.

In a ninth aspect, alone or in combination with one or more of the first through eighth aspects, the power distribution is based at least in part on a randomized distribution.

In a tenth aspect, alone or in combination with one or more of the first through ninth aspects, the power distribution is based at least in part on a pattern associated with the first initial set of maximum transmit powers.

In an eleventh aspect, alone or in combination with one or more of the first through tenth aspects, the power distribution is based at least in part on at least one of a predicted traffic pattern, a randomized distribution, or a pattern associated with the first initial set of maximum transmit powers.

In a twelfth aspect, alone or in combination with one or more of the first through eleventh aspects, transmitting based at least in part on at least one of the first maximum transmit power or the second maximum transmit power further comprises transmitting in accordance with the power distribution.

In a thirteenth aspect, alone or in combination with one or more of the first through twelfth aspects, the method further comprises transmitting a power headroom report indicating a modified power headroom based at least in part on the first priority initial maximum transmit power and the second priority initial maximum transmit power.

In a fourteenth aspect, alone or in combination with one or more of the first through thirteenth aspects, the modified power headroom is based at least in part on a combination of the first priority initial maximum transmit power and the second priority initial maximum transmit power.

In a fifteenth aspect, alone or in combination with one or more of the first through fourteenth aspects, the first initial maximum transmit power and the second initial maximum transmit power are based at least in part on a data transmission on a default data subscriber module.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
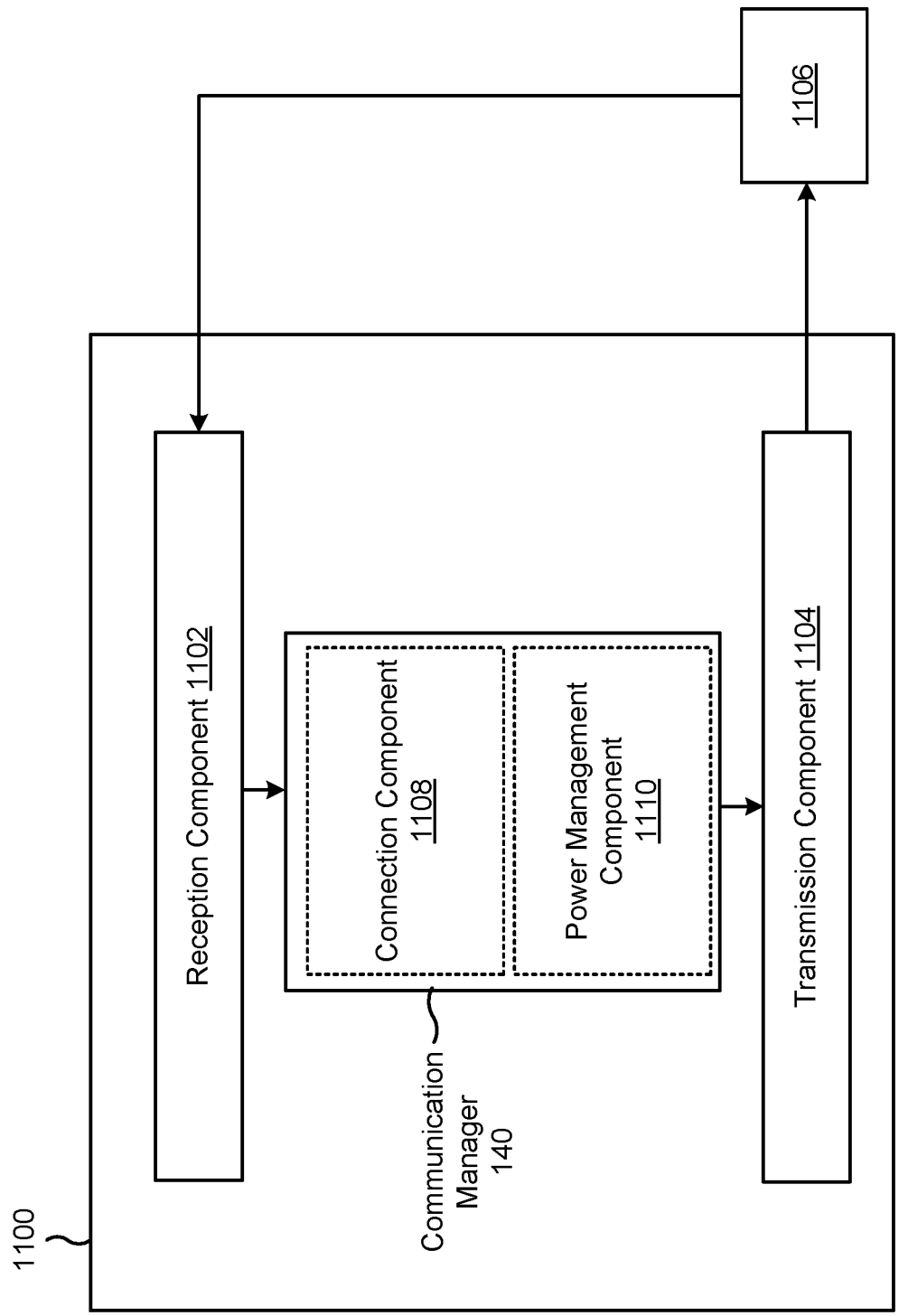
FIGS. 11 and 12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a connection component 1108 or a power management component 1110, among other examples.

In some aspects, the apparatus 1100 may be configured to perform one or more operations described herein in connection with FIGS. 5-7 and 9. Additionally, or alternatively, the apparatus 1100 may be configured to perform one or more processes described herein, such as process 800 of FIG. 8, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The power management component 1110 may identify a first power level, corresponding to a first time period, of a first SIM of the UE. The power management component 1110 may identify a second power level, corresponding to the first time period, of a second SIM of the UE, wherein the first power level and the second power level are identified based at least in part on at least one of an absorption rate or a permissible exposure limit. The power management component 1110 may adjust at least one of the first power level or the second power level during at least a portion of the first time period. The transmission component 1104 may transmit a first transmission using the adjusted at least one of the first power level or the second power level. In some aspects, the power management component 1110 may include one or more antennas, a modulator, a transmit MIMO processor, a transmit processor, a controller/processor, a memory, or a combination thereof, of the UE described above in connection with FIG. 2. In some aspects, the power management component 1110 may include the reception component 1102 and/or the transmission component 1104.

The power management component 1110 may determine that a prior aggregated power fails to satisfy an emission condition associated with the at least one of the absorption rate or the permissible exposure limit wherein adjustment of the at least one of the first power level or the second power level comprises applying, based at least in part on determining that the prior aggregated power fails to satisfy the emission condition, a power backoff to at least one of the first SIM or the second SIM.

The power management component 1110 may perform an asynchronous emission condition evaluation based at least in part on detecting an occurrence of an asynchronous evaluation trigger event.

The power management component 1110 may apply the first maximum power level to the first SIM for a first power adjustment interval. The power management component 1110 may apply the second maximum power level to the second SIM for the first power adjustment interval. The power management component 1110 may determine an occurrence of a power adjustment point. The power management component 1110 may apply, based at least in part on determining the occurrence of the power adjustment point, the first maximum power level to the second SIM for a second power adjustment interval.

The power management component 1110 may apply, based at least in part on determining the occurrence of the power adjustment point, the second maximum power level to the first SIM for the second power adjustment interval. The power management component 1110 may adjust a time length corresponding to at least one of the first power adjustment interval or the second power adjustment interval. The power management component 1110 may configure the power adjustment point.

The power management component 1110 may configure at least one additional power adjustment point. The power management component 1110 may apply the first maximum power level to the first SIM for a first power adjustment interval. The power management component 1110 may apply the second maximum power level to the second SIM for the first power adjustment interval.

The power management component 1110 may determine an occurrence of a power adjustment point. The power management component 1110 may apply, based at least in part on determining the occurrence of the power adjustment point, a third maximum power level to the second SIM for a second power adjustment interval. The power management component 1110 may apply, based at least in part on determining the occurrence of the power adjustment point, a fourth maximum power level to the first SIM for the second power adjustment interval.

The power management component 1110 may apply the first maximum power level to the first SIM for a first power adjustment interval, wherein the first SIM provides a service having a high priority during the first power adjustment interval. The power management component 1110 may apply the second maximum power level to the second SIM for the first power adjustment interval, wherein the second SIM provides a service having a low priority during the first power adjustment interval. The power management component 1110 may apply the first maximum power level to the first SIM for a second power adjustment interval, wherein the first SIM provides the service having the high priority during the second power adjustment interval. The power management component 1110 may apply the second maximum power level to the second SIM for the second power adjustment interval, wherein the second SIM provides the service having the low priority during the second power adjustment interval.

The power management component 1110 may implement a configuration that indicates the percentage. The power management component 1110 may reserve a reserve amount of the remaining energy for one or more usages corresponding to the first SIM.

The power management component 1110 may update the at least one of the first power level and the second power level using an iterative updating procedure based at least in part on one or more updating parameters.

The power management component 1110 may select at least one of the first antenna or the second antenna from a prioritized list of a plurality of antennas.

The power management component 1110 may determine that a performance of the first antenna satisfies a performance criterion based at least in part on a performance of a currently associated antenna.

The connection component 1108 may establish a first connection associated with a first subscriber module. The connection component 1108 may establish a second connection associated with a second subscriber module. The power management component 1110 may configure a first initial set of maximum transmit powers for the first subscriber module, wherein the first initial set of maximum transmit powers includes a first priority initial maximum transmit power and a second priority initial maximum transmit power. The power management component 1110 may configure a second initial set of maximum transmit powers for the first subscriber module, wherein the second initial set of maximum transmit powers includes a third priority initial maximum transmit power and a fourth priority initial maximum transmit power. The power management component 1110 may configure a first maximum transmit power associated with the first connection for the first subscriber module based at least in part on the first initial set of maximum transmit powers and an energy limit. The power management component 1110 may configure, independently of the configuration of the first maximum transmit power, a second maximum transmit power associated with the second connection for the second subscriber module based at least in part on an energy limit and the second initial set of maximum transmit powers. The transmission component 1104 may transmit based at least in part on at least one of the first maximum transmit power or the second maximum transmit power.

The transmission component 1104 may transmit, contemporaneously with the communication associated with the first subscriber module, a communication associated with the second subscriber module at the second maximum transmit power.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
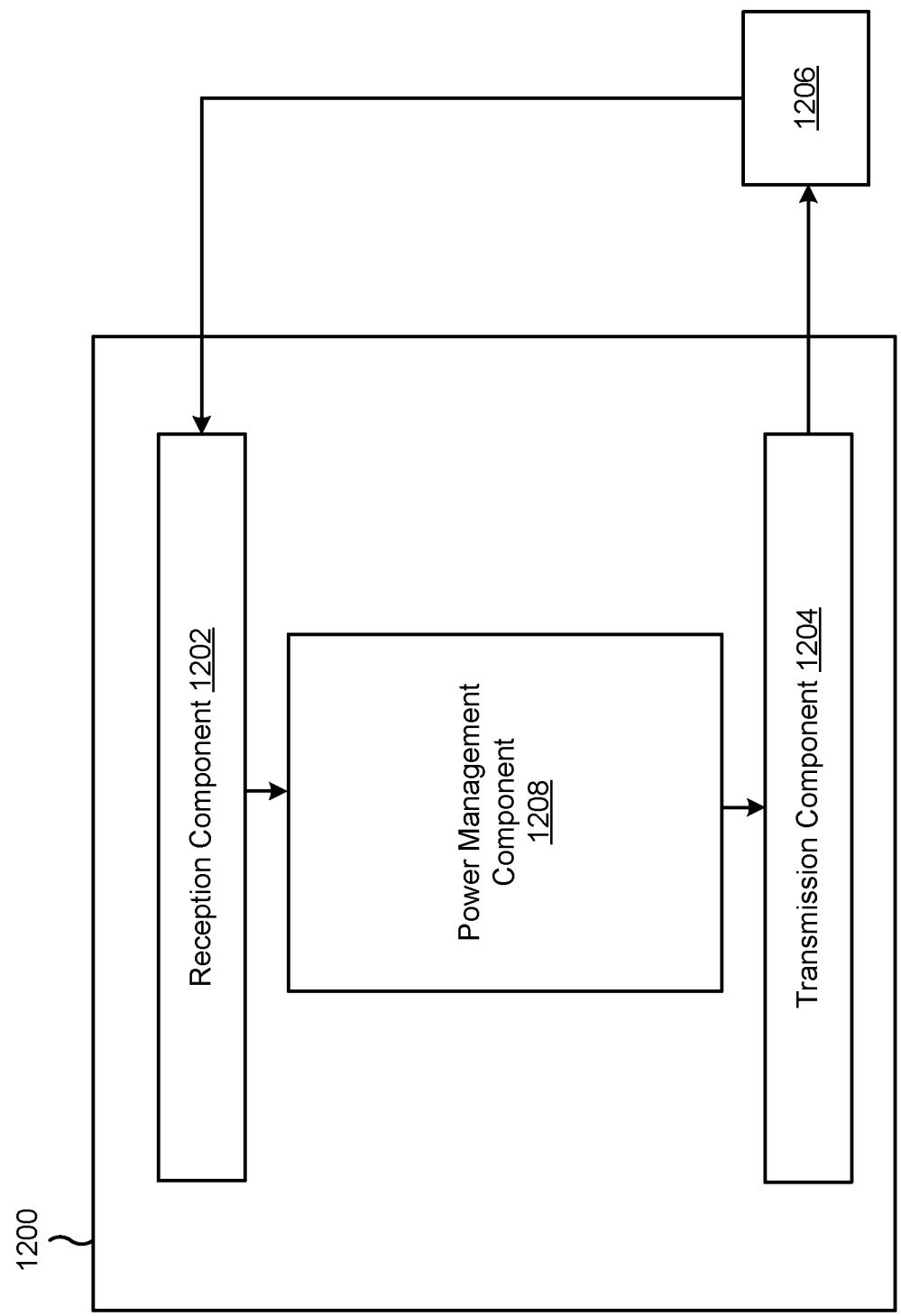

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a power management component 1208.

In some aspects, the apparatus 1200 may be configured to perform one or more operations described herein in connection with FIGS. 5-7 and 9. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The power management component 1208 may determine one or more configurations, resource allocations, and/or power-related parameters. In some aspects, the power management component 1208 may include one or more antennas, a modulator, a transmit MIMO processor, a transmit processor, a controller/processor, a memory, or a combination thereof, of the base station described above in connection with FIG. 2. In some aspects, the power management component 1208 may include the reception component 1202 and/or the transmission component 1204.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: establishing a first connection associated with a first subscriber module; establishing a second connection associated with a second subscriber module; configuring a first initial set of maximum transmit powers for the first subscriber module, wherein the first initial set of maximum transmit powers includes a first priority initial maximum transmit power and a second priority initial maximum transmit power; configuring a second initial set of maximum transmit powers for the second subscriber module, wherein the second initial set of maximum transmit powers includes a third priority initial maximum transmit power and a fourth priority initial maximum transmit power; configuring a first maximum transmit power associated with the first connection for the first subscriber module based at least in part on the first initial set of maximum transmit powers and an energy limit; configuring, independently of the configuration of the first maximum transmit power, a second maximum transmit power associated with the second connection for the second subscriber module based at least in part on the energy limit and the second initial set of maximum transmit powers; and transmitting based at least in part on at least one of the first maximum transmit power or the second maximum transmit power.

Aspect 2: The method of Aspect 1, wherein configuring the first maximum transmit power and the second maximum transmit power is based at least in part on an amount of unused energy of the energy limit.

Aspect 3: The method of Aspect 2, wherein the amount of unused energy is based at least in part on a number of slots associated with no grant or a grant using less than all of an energy associated with a corresponding slot.

Aspect 4: The method of either of Aspects 2 or 3, wherein transmitting based at least in part on at least one of the first maximum transmit power or the second maximum transmit power further comprises: transmitting, during a time period associated with the second priority initial maximum transmit power for the first subscriber module, a communication associated with the first subscriber module at the first priority initial maximum transmit power based at least in part on the amount of unused energy of the energy limit satisfying a threshold.

Aspect 5: The method of Aspect 4, further comprising transmitting, contemporaneously with the communication associated with the first subscriber module, a communication associated with the second subscriber module at the second maximum transmit power.

Aspect 6: The method of either of Aspects 4 or 5, wherein the communication is transmitted at the first maximum transmit power based at least in part on the communication being associated with a priority value that satisfies a threshold.

Aspect 7: The method of any of Aspects 2-6, wherein the first subscriber module is associated with a first amount of unused energy used to configure the first maximum transmit power and the second subscriber module is associated with a second amount of unused energy used to configure the second subscriber module.

Aspect 8: The method of any of Aspects 1-7, wherein configuring the first maximum transmit power and the second maximum transmit power further comprises configuring a power distribution in a time period based at least in part on the energy limit, the first initial set of maximum transmit powers, and the second initial set of maximum transmit powers.

Aspect 9: The method of Aspect 8, wherein the power distribution is based at least in part on a predicted traffic pattern.

Aspect 10: The method of either of Aspects 8 or 9, wherein the power distribution is based at least in part on a randomized distribution.

Aspect 11: The method of any of Aspects 8-10, wherein the power distribution is based at least in part on a pattern associated with the first initial set of maximum transmit powers.

Aspect 12: The method of any of Aspects 8-11, wherein the power distribution is based at least in part on at least one of: a predicted traffic pattern, a randomized distribution, or a pattern associated with the first initial set of maximum transmit powers.

Aspect 13: The method of any of Aspects 8-12, wherein transmitting based at least in part on at least one of the first maximum transmit power or the second maximum transmit power further comprises transmitting in accordance with the power distribution.

Aspect 14: The method of any of Aspects 1-13, wherein the method further comprises transmitting a power headroom report indicating a modified power headroom based at least in part on the first priority initial maximum transmit power and the second priority initial maximum transmit power.

Aspect 15: The method of Aspect 14, wherein the modified power headroom is based at least in part on a combination of the first priority initial maximum transmit power and the second priority initial maximum transmit power.

Aspect 16: The method of any of Aspects 1-15, wherein the first initial maximum transmit power and the second initial maximum transmit power are based at least in part on a data transmission on a default data subscriber module.

Aspect 17: The method of any of Aspects 1-16, wherein the energy limit is based at least in part on a maximum permissible energy limitation or a specific absorption rate limitation.

Aspect 18: A method of wireless communication performed by a user equipment (UE), comprising: identifying a first power level, corresponding to a first time period, of a first subscriber identity module (SIM) of the UE; identifying a second power level, corresponding to the first time period, of a second SIM of the UE, wherein the first power level and the second power level are identified based at least in part on at least one of an absorption rate or a permissible exposure limit; adjusting at least one of the first power level or the second power level during at least a portion of the first time period; and transmitting a first transmission using the adjusted at least one of the first power level or the second power level.

Aspect 19: The method of Aspect 18, further comprising determining that a prior aggregated power fails to satisfy an emission condition associated with the at least one of the absorption rate or the permissible exposure limit, wherein adjustment of the at least one of the first power level or the second power level comprises applying, based at least in part on determining that the prior aggregated power fails to satisfy the emission condition, a power backoff to at least one of the first SIM or the second SIM.

Aspect 20: The method of Aspect 19, wherein application of the power backoff comprises: determining a first priority level associated with the first transmission; and determining a second priority level associated with a second transmission, wherein the first priority level is higher than the second priority level, wherein applying the power backoff comprises applying the power backoff based at least in part on determining the first priority level and the second priority level.

Aspect 21: The method of Aspect 20, wherein the first transmission comprises an active voice transmission.

Aspect 22: The method of Aspect 21, wherein the second transmission comprises at least one of: a delay-sensitive gaming transmission, a voice on-hold transmission, or an internet data transmission.

Aspect 23: The method of Aspect 22, wherein a priority level associated with the voice on-hold transmission is higher than a priority level associated with the internet data transmission, wherein a priority level associated with the delay-sensitive gaming transmission is higher than the priority level associated with the voice on-hold transmission, and wherein a priority level associated with the active voice transmission is higher than the priority level associated with the delay-sensitive gaming transmission.

Aspect 24: The method of any of Aspects 20-23, wherein the first transmission corresponds to at least one of: a wireless wide area network, wherein the second transmission corresponds to a wireless local area network, a primary component carrier, wherein the second transmission corresponds to a secondary component carrier, or a first frequency range, wherein the second transmission corresponds to a second frequency range.

Aspect 25: The method of any of Aspects 20-24, wherein determination of the first priority level associated with the first transmission comprises determining the first priority level based at least in part on at least one of a determination that at least one of an uplink event or an uplink grant comprises at least one of: a high priority signaling event, a carrier-sanctioned voice transmission, a carrier-sanctioned video telephony transmission, a conversational video transmission, internet data, best-effort data, over-the-top data, multimedia messaging service data, short message service data, gaming data, extended reality data, or a shared transmission.

Aspect 26: The method of any of Aspects 18-25, wherein the first time period comprises an emission control loop interval.

Aspect 27: The method of any of Aspects 18-26, further comprising performing an asynchronous emission condition evaluation based at least in part on detecting an occurrence of an asynchronous evaluation trigger event.

Aspect 28: The method of Aspect 27, wherein the asynchronous evaluation trigger event comprises a service priority switch event, and wherein detection of the occurrence of the asynchronous evaluation trigger event comprises: determining that the first SIM switched from providing a first service having a first priority level to a second service having a second priority level that is different than the first priority level; and determining that the second SIM switched from providing a third service having the second priority level to a fourth service having the first priority level.

Aspect 29: The method of Aspect 28, wherein the first priority level is a high priority level and wherein the second priority level is a low priority level.

Aspect 30: The method of either of Aspects 28 or 29, wherein a power class associated with a band used by the first SIM is the same as or different than a power class associated with a band used by the second SIM.

Aspect 31: The method of any of Aspects 27-30, wherein detection of the occurrence of the asynchronous evaluation trigger event comprises detecting the occurrence of the asynchronous evaluation trigger event within a synchronous evaluation window.

Aspect 32: The method of any of Aspects 18-31, wherein the first SIM uses a first antenna of an antenna group to transmit the first transmission, wherein the second SIM uses a second antenna of the antenna group to transmit a second transmission, and wherein determination of the first power level and the second power level comprises: determining a first maximum power level corresponding to a first power adjustment interval comprising a high priority power adjustment interval; and determining a second maximum power level corresponding to a second power adjustment interval comprising a low priority power adjustment interval.

Aspect 33: The method of Aspect 32, further comprising: applying the first maximum power level to the first SIM for the first power adjustment interval; applying the second maximum power level to the second SIM for the first power adjustment interval; determining an occurrence of a power adjustment point; applying, based at least in part on determining the occurrence of the power adjustment point, the first maximum power level to the second SIM for the second power adjustment interval; and applying, based at least in part on determining the occurrence of the power adjustment point, the second maximum power level to the first SIM for the second power adjustment interval.

Aspect 34: The method of Aspect 33, further comprising adjusting a time length corresponding to at least one of the first power adjustment interval or the second power adjustment interval.

Aspect 35: The method of either of Aspects 33 or 34, further comprising configuring the power adjustment point.

Aspect 36: The method of Aspect 35, further comprising configuring at least one additional power adjustment point.

Aspect 37: The method of either of Aspects 35 or 36, wherein configuration of the power adjustment point comprises associating the power adjustment point with a slot boundary.

Aspect 38: The method of any of Aspects 33-37, wherein determination of the occurrence of the power adjustment point comprises determining an ending point of the first power adjustment interval based at least in part on a timing configuration, wherein the timing configuration indicates: at least one high priority power adjustment interval allocated to the first SIM, wherein the at least one high priority power adjustment interval allocated to the first SIM corresponds to at least one low priority power adjustment interval allocated to the second SIM; and at least one low priority power adjustment interval allocated to the first SIM, wherein the at least one low priority power adjustment interval allocated to the first SIM corresponds to at least one high priority power adjustment interval allocated to the second SIM.

Aspect 39: The method of any of Aspects 32-38, further comprising: applying the first maximum power level to the first SIM for the first power adjustment interval; applying the second maximum power level to the second SIM for the first power adjustment interval; determining an occurrence of a power adjustment point; applying, based at least in part on determining the occurrence of the power adjustment point, a third maximum power level to the second SIM for the second power adjustment interval; and applying, based at least in part on determining the occurrence of the power adjustment point, a fourth maximum power level to the first SIM for the second power adjustment interval.

Aspect 40: The method of Aspect 39, wherein the third maximum power level corresponds to a first radio access technology (RAT), and wherein the fourth maximum power level corresponds to a second RAT.

Aspect 41: The method of any of Aspects 18-40, wherein the first SIM uses a first antenna of a first antenna group to transmit the first transmission, wherein the second SIM uses a second antenna of a second antenna group to transmit a second transmission, and wherein identifying the first power level and the second power level comprises: determining a first maximum power level corresponding to the first SIM; and determining a second maximum power level corresponding to the second SIM.

Aspect 42: The method of Aspect 41, further comprising: applying the first maximum power level to the first SIM for a first power adjustment interval, wherein the first SIM provides a service having a high priority during the first power adjustment interval; applying the second maximum power level to the second SIM for the first power adjustment interval, wherein the second SIM provides a service having a low priority during the first power adjustment interval; applying the first maximum power level to the first SIM for a second power adjustment interval, wherein the first SIM provides the service having the high priority during the second power adjustment interval; and applying the second maximum power level to the second SIM for the second power adjustment interval, wherein the second SIM provides the service having the low priority during the second power adjustment interval.

Aspect 43: The method of any of Aspects 18-42, wherein identifying the first power level and the second power level comprises: allocating the first power level to the first SIM during a prior high priority power adjustment interval; referencing an energy profile associated with the prior high priority power adjustment interval; determining an amount of transferrable energy based at least in part on referencing the energy profile; and allocating the second power level to the second SIM for a second transmission, wherein the second power level comprises the amount of transferrable energy.

Aspect 44: The method of Aspect 43, wherein determining the amount of transferrable energy comprises determining a percentage of a remaining energy associated with the first SIM during the prior high priority power adjustment interval.

Aspect 45: The method of Aspect 44, further comprising implementing a configuration that indicates the percentage.

Aspect 46: The method of either of Aspects 44 or 45, further comprising reserving a reserve amount of the remaining energy for one or more usages corresponding to the first SIM.

Aspect 47: The method of any of Aspects 43-46, further comprising updating the at least one of the first power level and the second power level using an iterative updating procedure based at least in part on one or more updating parameters.

Aspect 48: The method of Aspect 47, wherein the one or more updating parameters comprise at least one of: an updated amount of transferrable energy, an amount of transferrable energy used by the second SIM during the second transmission, a power class associated with the first SIM, a power class associated with the second SIM, a configured maximum power of the first SIM, a configured maximum power of the second SIM, a spatial relationship between an antenna used by the first SIM and an antenna used by the second SIM, a radio access technology (RAT) used by the first SIM, an energy efficiency associated with the RAT used by the first SIM, a spectrum efficiency associated with the RAT used by the first SIM, a RAT used by the second SIM, an energy efficiency associated with the RAT used by the second SIM, or a spectrum efficiency associated with the RAT used by the second SIM.

Aspect 49: The method of any of Aspects 18-48, wherein identifying the first power level and the second power level comprises: associating the first SIM with a first antenna, wherein the first power level is associated with the first antenna; and associating the second SIM with a second antenna, wherein the second power level is associated with the second antenna.

Aspect 50: The method of Aspect 49, wherein the first antenna is associated with a first antenna group, and wherein the second antenna is associated with a second antenna group.

Aspect 51: The method of either of Aspects 49 or 50, further comprising selecting at least one of the first antenna or the second antenna from a prioritized list of a plurality of antennas.

Aspect 52: The method of any of Aspects 49-51, wherein the first antenna is included in a first prioritized list, corresponding to the first SIM, of a first plurality of antennas, and wherein the second antenna is included in a second prioritized list, corresponding to the second SIM, of a second plurality of antennas.

Aspect 53: The method of any of Aspects 49-52, further comprising determining that a performance of the first antenna satisfies a performance criterion based at least in part on a performance of a currently associated antenna.

Aspect 54: An apparatus for wireless communication at a device, comprising a processor; memory coupled with the processor; and instructions stored in the memory and executable by the processor to cause the apparatus to perform the method of one or more of Aspects 1-18.

Aspect 55: A device for wireless communication, comprising a memory and one or more processors coupled to the memory, the one or more processors configured to perform the method of one or more of Aspects 1-18.

Aspect 56: An apparatus for wireless communication, comprising at least one means for performing the method of one or more of Aspects 1-18.

Aspect 57: A non-transitory computer-readable medium storing code for wireless communication, the code comprising instructions executable by a processor to perform the method of one or more of Aspects 1-18.

Aspect 58: A non-transitory computer-readable medium storing a set of instructions for wireless communication, the set of instructions comprising one or more instructions that, when executed by one or more processors of a device, cause the device to perform the method of one or more of Aspects 1-18.

Aspect 59: An apparatus for wireless communication at a device, comprising a processor; memory coupled with the processor; and instructions stored in the memory and executable by the processor to cause the apparatus to perform the method of one or more of Aspects 19-53.

Aspect 60: A device for wireless communication, comprising a memory and one or more processors coupled to the memory, the one or more processors configured to perform the method of one or more of Aspects 19-53.

Aspect 61: An apparatus for wireless communication, comprising at least one means for performing the method of one or more of Aspects 19-53.

Aspect 62: A non-transitory computer-readable medium storing code for wireless communication, the code comprising instructions executable by a processor to perform the method of one or more of Aspects 19-53.

Aspect 63: A non-transitory computer-readable medium storing a set of instructions for wireless communication, the set of instructions comprising one or more instructions that, when executed by one or more processors of a device, cause the device to perform the method of one or more of Aspects 19-53.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    establishing a first connection associated with a first subscriber module;
    establishing a second connection associated with a second subscriber module;
    configuring a first initial set of maximum transmit powers for the first subscriber module, wherein the first initial set of maximum transmit powers includes a first priority initial maximum transmit power and a second priority initial maximum transmit power;
    configuring a second initial set of maximum transmit powers for the second subscriber module, wherein the second initial set of maximum transmit powers includes a third priority initial maximum transmit power and a fourth priority initial maximum transmit power;
    configuring a first maximum transmit power associated with the first connection for the first subscriber module based at least in part on the first initial set of maximum transmit powers and compliance budget;
    configuring, independently of the configuration of the first maximum transmit power, a second maximum transmit power associated with the second connection for the second subscriber module based at least in part on the compliance budget and the second initial set of maximum transmit powers; and
    transmitting based at least in part on at least one of the first maximum transmit power or the second maximum transmit power.

2. The method of claim 1, wherein configuring the first maximum transmit power and the second maximum transmit power is based at least in part on an amount of unused energy of the compliance budget.

3. The method of claim 2, wherein the amount of unused energy is based at least in part on a number of slots associated with no grant or a grant using less than all of an energy associated with a corresponding slot.

4. The method of claim 2, wherein transmitting based at least in part on at least one of the first maximum transmit power or the second maximum transmit power further comprises:
    transmitting, during a time period associated with the second priority initial maximum transmit power for the first subscriber module, a communication associated with the first subscriber module at the first priority initial maximum transmit power based at least in part on the amount of unused energy of the compliance budget satisfying a threshold.

5. The method of claim 4, further comprising transmitting, contemporaneously with the communication associated with the first subscriber module, a communication associated with the second subscriber module at the second maximum transmit power.

6. The method of claim 4, wherein the communication is transmitted at the first maximum transmit power based at least in part on the communication being associated with a priority value that satisfies a threshold.

7. The method of claim 2, wherein the first subscriber module is associated with a first amount of unused energy used to configure the first maximum transmit power and the second subscriber module is associated with a second amount of unused energy used to configure the second subscriber module.

8. The method of claim 1, wherein configuring the first maximum transmit power and the second maximum transmit power further comprises configuring a power distribution in a time period based at least in part on the compliance budget, the first initial set of maximum transmit powers, and the second initial set of maximum transmit powers.

9. The method of claim 8, wherein the power distribution is based at least in part on at least one of:
    a predicted traffic pattern,
    a randomized distribution, or
    a pattern associated with the first initial set of maximum transmit powers.

10. The method of claim 1, further comprising transmitting a power headroom report indicating a modified power headroom based at least in part on the first priority initial maximum transmit power and the second priority initial maximum transmit power.

11. The method of claim 1, wherein the first initial maximum transmit power and the second initial maximum transmit power are based at least in part on a data transmission on a default data subscriber module.

12. The method of claim 1, wherein the compliance budget is based at least in part on a maximum permissible energy limitation or a specific absorption rate limitation.

* * * * *